Inventors
BEN ALEXANDER
GEORGES A. DESCHAMPS
By Philip M. Bolton
Attorney

Fig. 2

|  | I | II | III |  |
|---|---|---|---|---|
|  |  |  |  | X |
| $\delta_x \rightarrow$ | $-2^{-6}R_{Iz}$ | $-2^{-6}R_{IIz}$ | $-2^{-6}R_{IIIz}$ | y |
|  | $+2^{-6}R_{Iy}$ | $+2^{-6}R_{IIy}$ | $+2^{-6}R_{IIIy}$ | z |

|  | I | II | III |  |
|---|---|---|---|---|
|  | $+2^{-6}R_{Iz}$ | $+2^{-6}R_{IIz}$ | $+2^{-6}R_{IIIz}$ | X |
| $\delta_y \rightarrow$ |  |  |  | y |
|  | $-2^{-6}R_{Ix}$ | $-2^{-6}R_{IIx}$ | $-2^{-6}R_{IIIx}$ | z |

|  | I | II | III |  |
|---|---|---|---|---|
|  | $-2^{-6}R_{Iy}$ | $-2^{-6}R_{IIy}$ | $-2^{-6}R_{IIIy}$ | X |
| $\delta_z \rightarrow$ | $+2^{-6}R_{Ix}$ | $+2^{-6}R_{IIx}$ | $+2^{-6}R_{IIIx}$ | y |
|  |  |  |  | z |

Inventors
BEN ALEXANDER
GEORGES A. DESCHAMPS
By Philip M. Bolton
Attorney

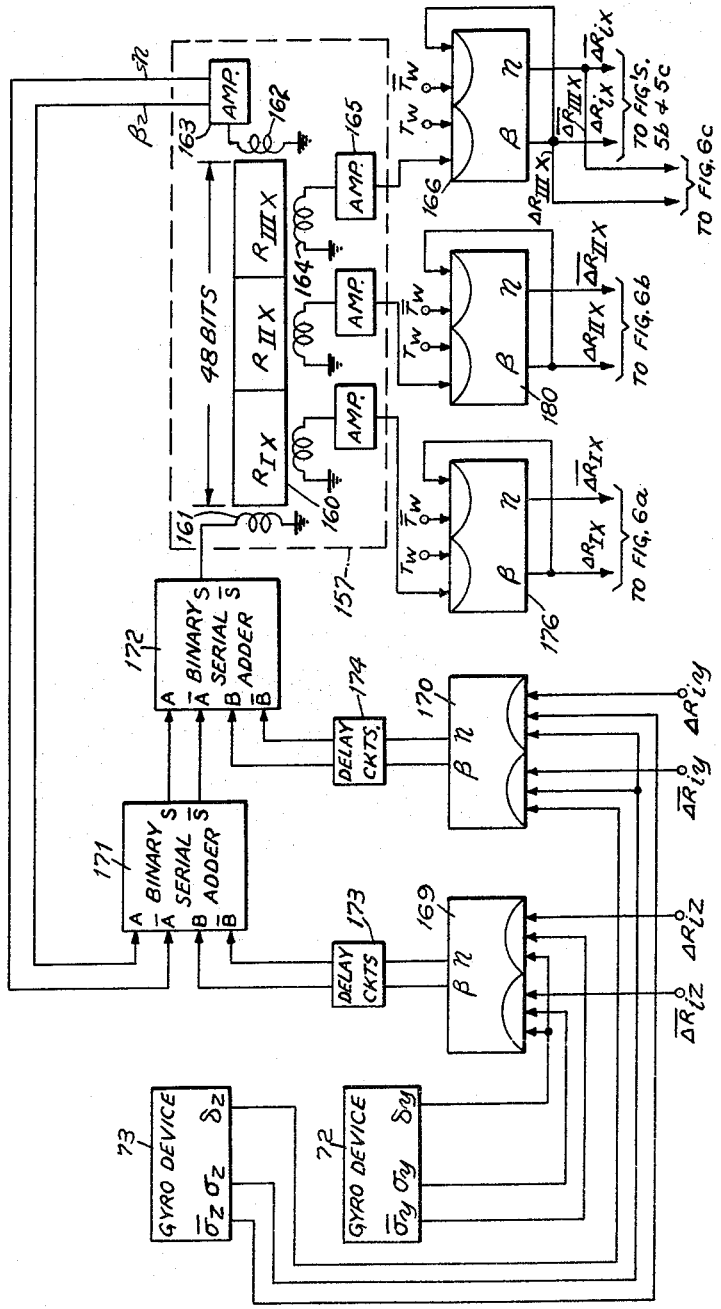

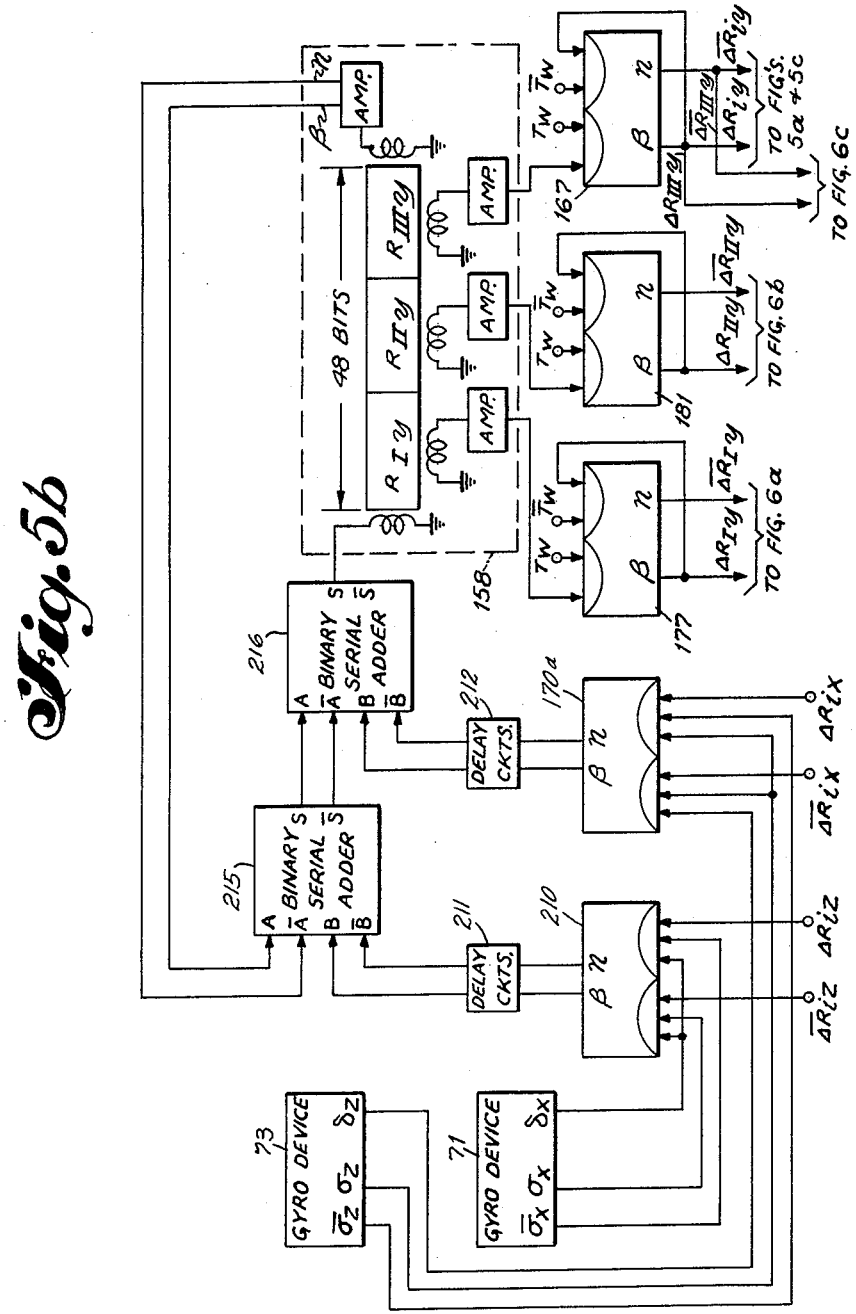

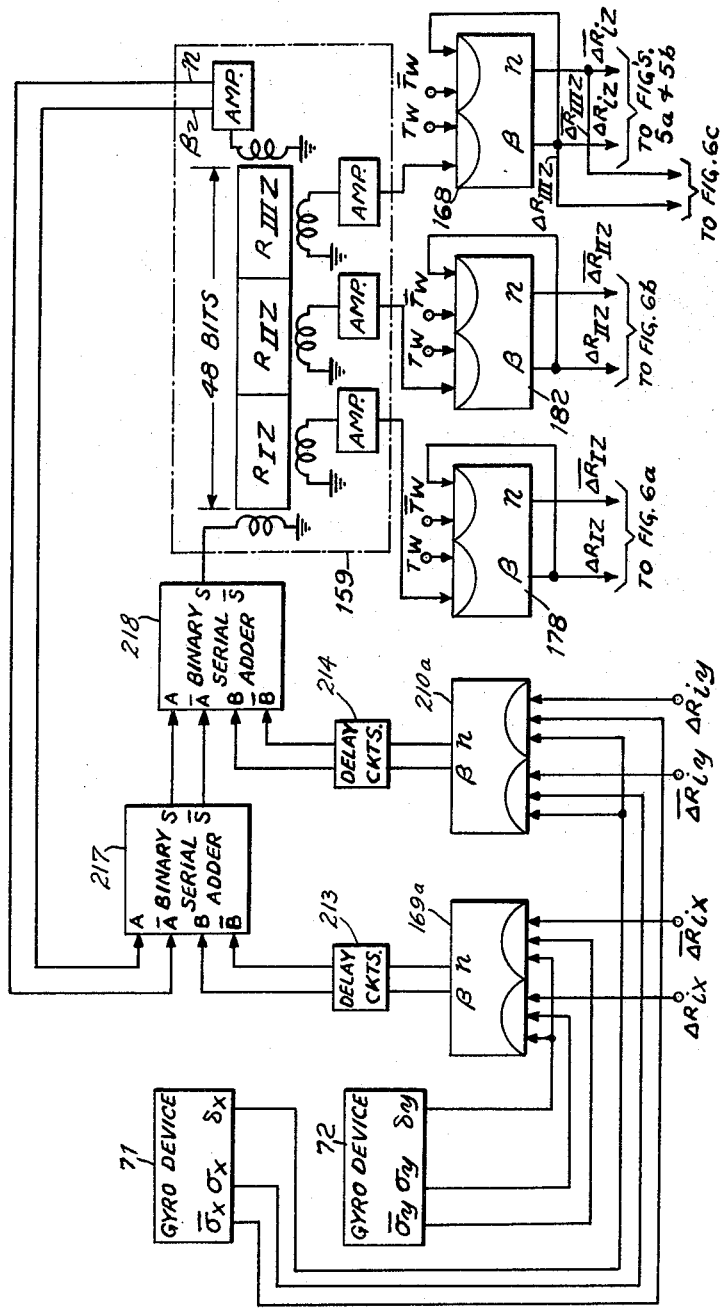

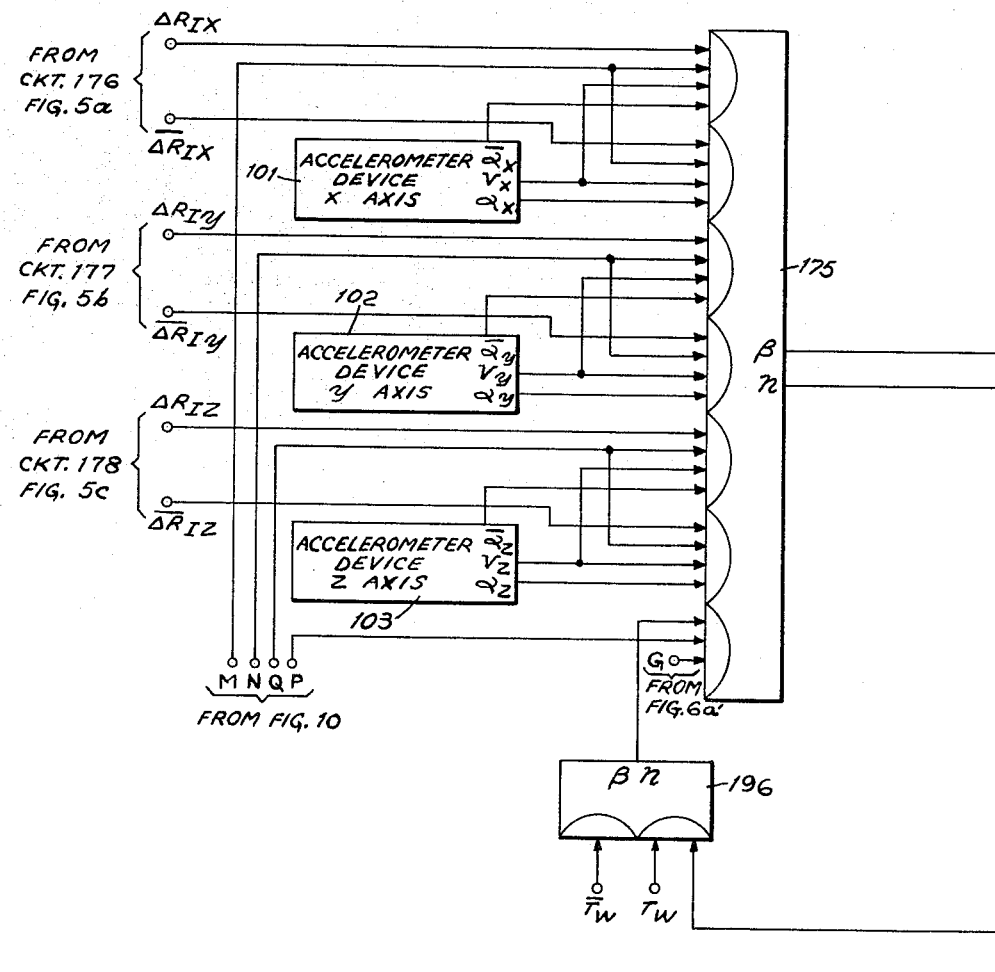

July 13, 1965  B. ALEXANDER ETAL  3,194,948
VELOCITY AND POSITION COMPUTER
Filed Aug. 7, 1958  18 Sheets-Sheet 9

Inventors
BEN ALEXANDER
GEORGES A. DESCHAMPS
By Philip M. Bolton
Attorney

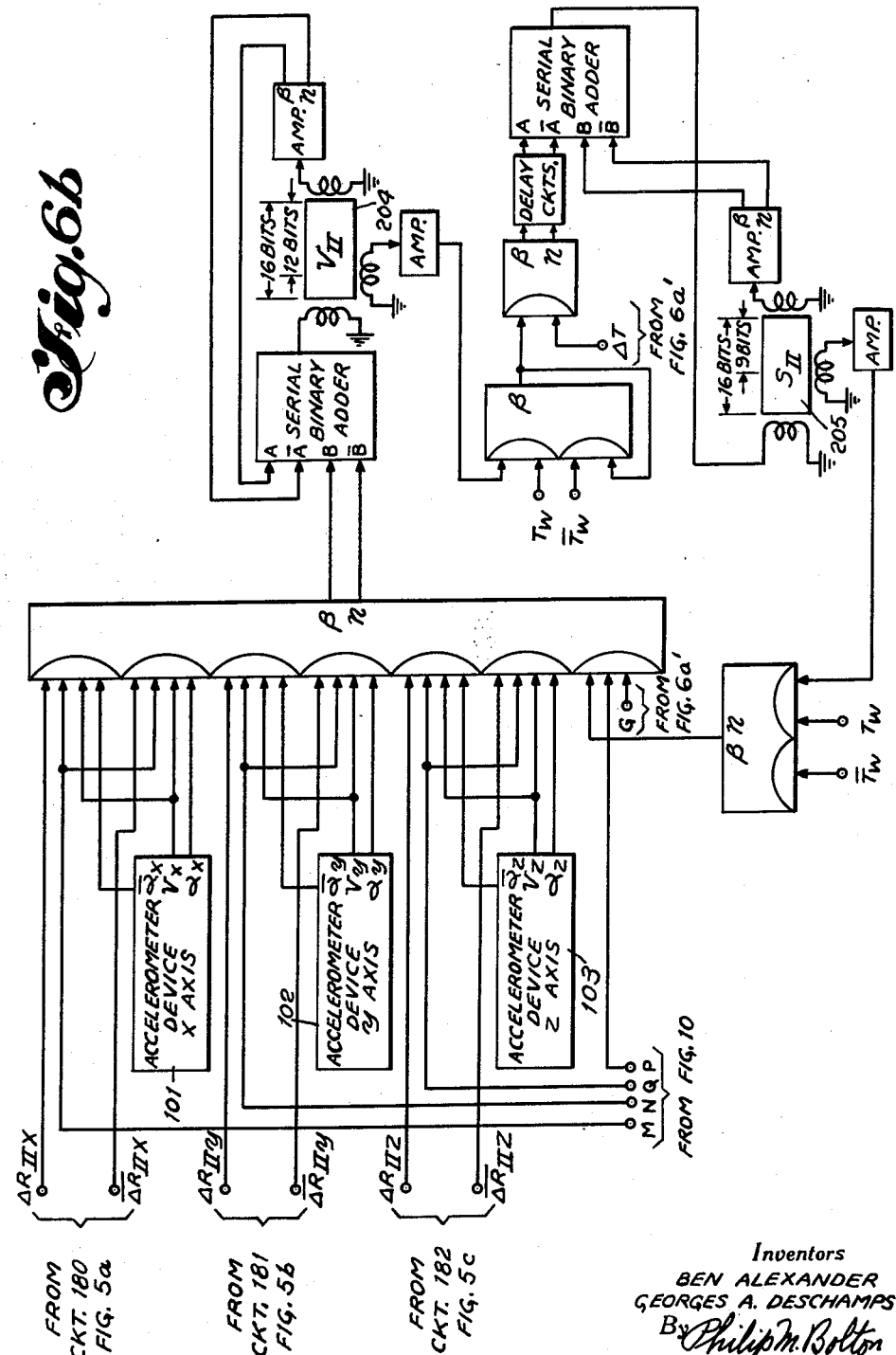

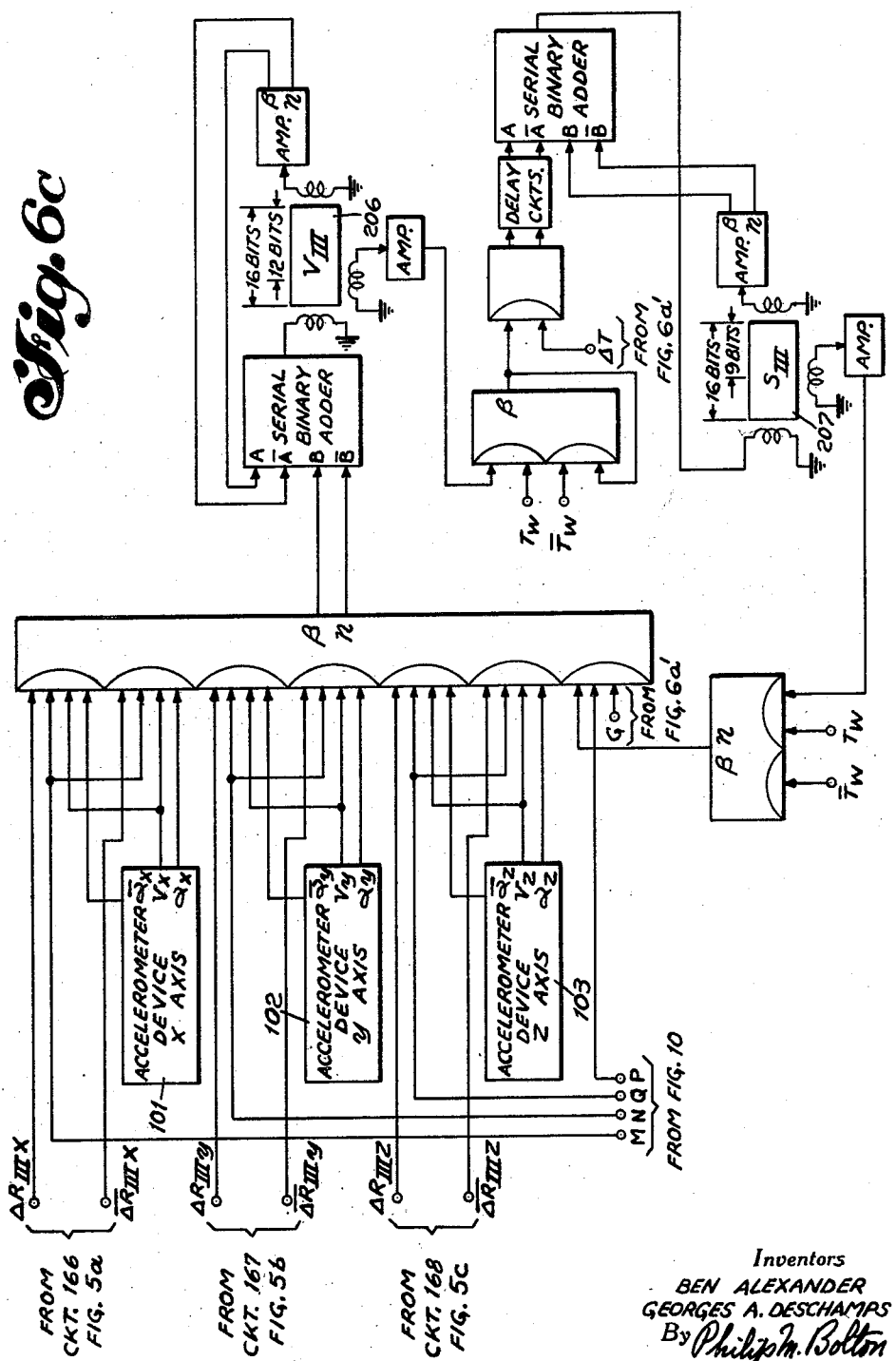

July 13, 1965  B. ALEXANDER ETAL  3,194,948
VELOCITY AND POSITION COMPUTER
Filed Aug. 7, 1958  18 Sheets-Sheet 12

$\beta_{60} \quad \beta_{60} = (\ominus \cdot \phi) \vee (M \cdot \beta)$ $n_{60} \quad n_{60} = (\bar{\ominus} \vee \phi) \cdot (M \vee n)$ Inventors
BEN ALEXANDER
GEORGES A. DESCHAMPS
By Philip M. Bolton
Attorney

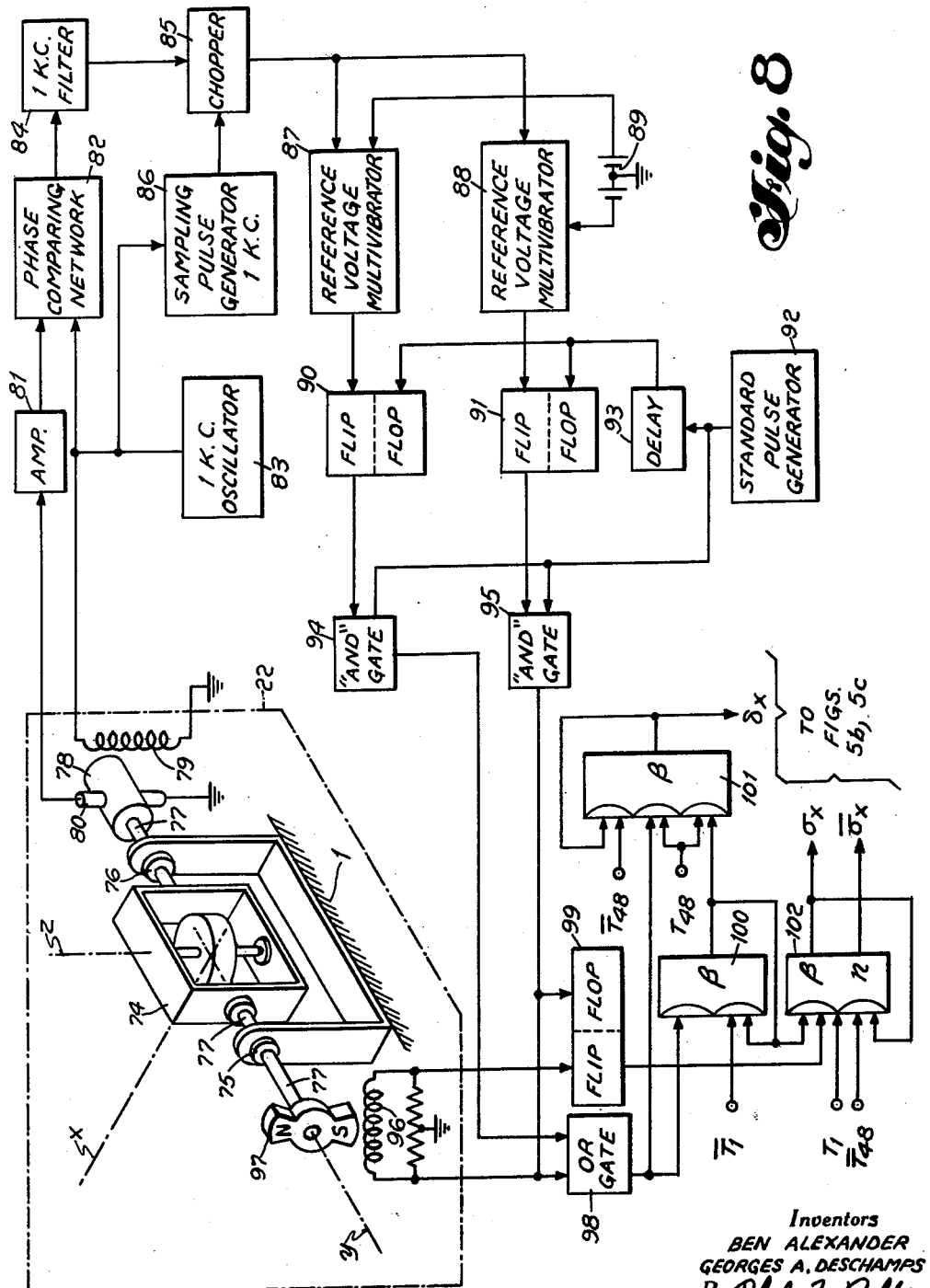

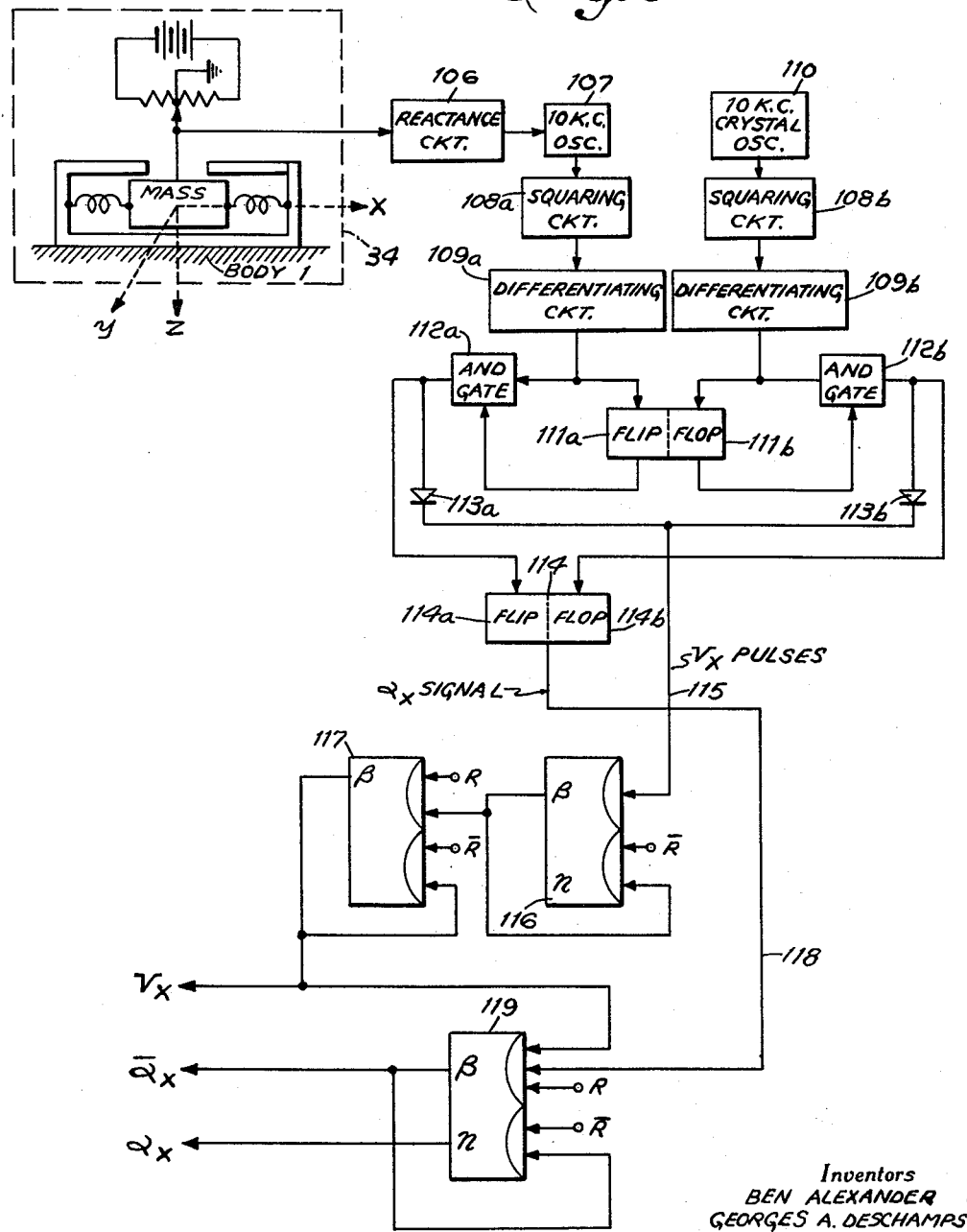

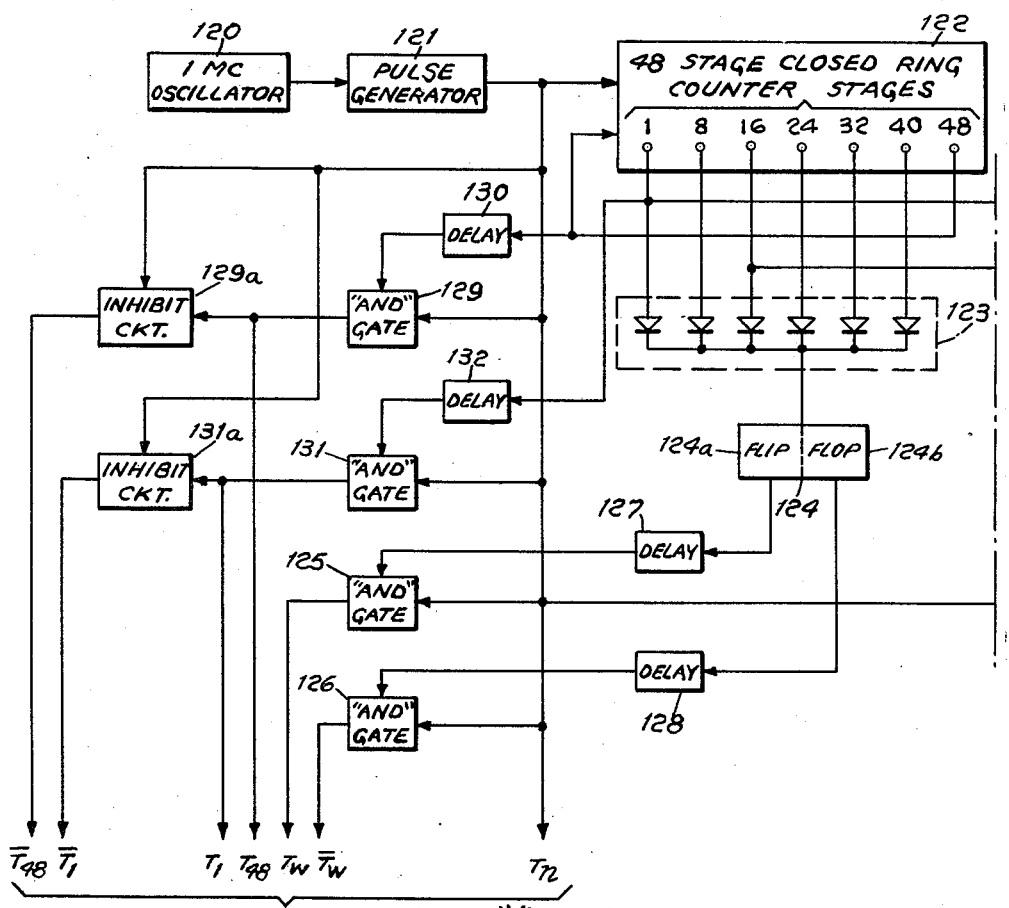

Fig. 11a

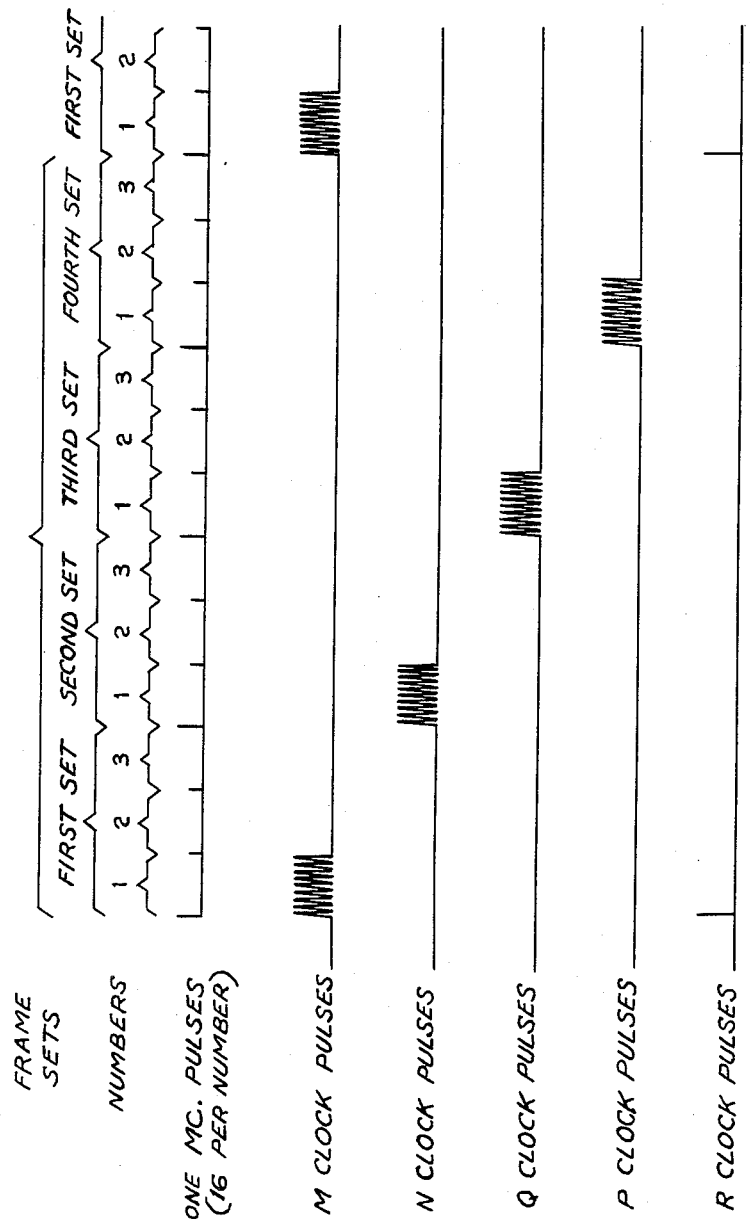

3,194,948
VELOCITY AND POSITION COMPUTER

Ben Alexander, Nutley, N.J., and Georges A. Deschamps, New York, N.Y., assignors to International Telephone and Telegraph Corporation, Nutley, N.J., a corporation of Maryland
Filed Aug. 7, 1958, Ser. No. 753,692
12 Claims. (Cl. 235—151)

This invention relates to systems for determining and producing signals representative of the attitude, velocity and position of a vehicle in a given frame of reference, and particularly to such systems using rotation and translation sensors and determining the attitude, velocity and position of a vehicle with respect to a three-dimensional reference frame.

In the control and guidance of many vehicles, such as airplanes, missiles, artificial satellites, etc., it is important to determine the attitude or orientation and location of the vehicle with respect to a three-dimensional frame of reference, which frame may be fixed or rotating or translating. One use for such information is in enabling an airplane or missile to maintain its proper orientation and navigate in said reference frame either by pilot or human control or automatically. Another typical example of this is, of course, in inertial guidance systems, wherein, to determine the velocity and position of the vehicle in a given reference frame, translational accelerations must be resolved in accordance with the attitude of the vehicle within said frame.

It has heretofore been proposed in inertial guidance systems for aircraft and missiles to employ a platform on which inertia sensors are mounted, the platform being maintained stable with respect to a fixed reference frame or with respect to a reference frame using the earth's vertical as one of its axes and to derive accelerations, velocities and translations of the aircraft or missile with respect to the reference frame from said inertia sensors. Despite rotations of the vehicle, the orientation of the platform in such inertial guidance systems is always kept fixed with respect to the reference frame, and the velocity and position of the craft may be determined from said inertial sensors. To maintain the stability of such a platform with respect to its reference frame has required a complex structure utilizing a number of gyros, a number of gimbals, one mounted upon another, driving servos, and analog feedback loops utilizing analog information from the gyros to energize motors for maintaining the platform stable. Such stabilized platform systems are mechanically complex and present many difficulties both in manufacture and use.

An object of the present invention is the provision of an improved system for determining and producing signals representing the attitude, velocity and position of a craft with respect to a reference frame, particularly a three-dimensional frame.

Another object of the present invention is the provision of such a system in which the stabilized platform is dispensed with and in which information as to the attitude of the craft is stored in a suitable storage device, and this attitude information is employed in conjunction with translational information from inertia sensors to continuously store information representative of the velocity and position of the craft in said reference frame.

In accordance with a main feature of the present invention, there is provided a system for providing information representing the attitude, velocity and position of a body with respect to a reference spatial frame comprising means for sensing rotations and translations of said body, means coupled to said sensing means for producing signals representative of said rotations and translations, means for storing information representative of the attitude, velocity and position of said body with respect to said reference frame, and means coupled to said sensing means for changing the information in said storage means to thereby continuously provide stored information representative of the attitude, velocity and position of said body with respect to said reference frame.

In accordance with another more specific feature of the present invention, gyroscopes and accelerometers are arranged with respect to the body, for example by being mechanically fixed thereto, so that the rotation-sensing axes of said gyros bear a fixed relationship to the orientation of said accelerometers whereby, as the vehicle rotates and accelerates with respect to the reference frame, signals representing these rotations and accelerations are produced, these signals being fed to computers which compute attitude, velocity and position of the craft with respect to the predetermined frame of reference and stores this information.

In accordance with a further aspect of the present invention, the computers store numerical information representative of the attitude, velocity and position of the craft with respect to the reference frame, and from the gyros and accelerometers, signals are obtained representing predetermined, for example, equal, increments of rotation and velocity changes about and along, respectively, their sensitive axes, these incremental signals being used to vary the stored information.

Other and further objects and features of the present invention will become apparent, and the foregoing will be better understood with reference to the following description of embodiments thereof, reference being had to the drawings, in which:

FIG. 2 is a chart showing the interrelationship between stored numbers representing attitude of said body as controlled by gyro signals;

Figure 6A:
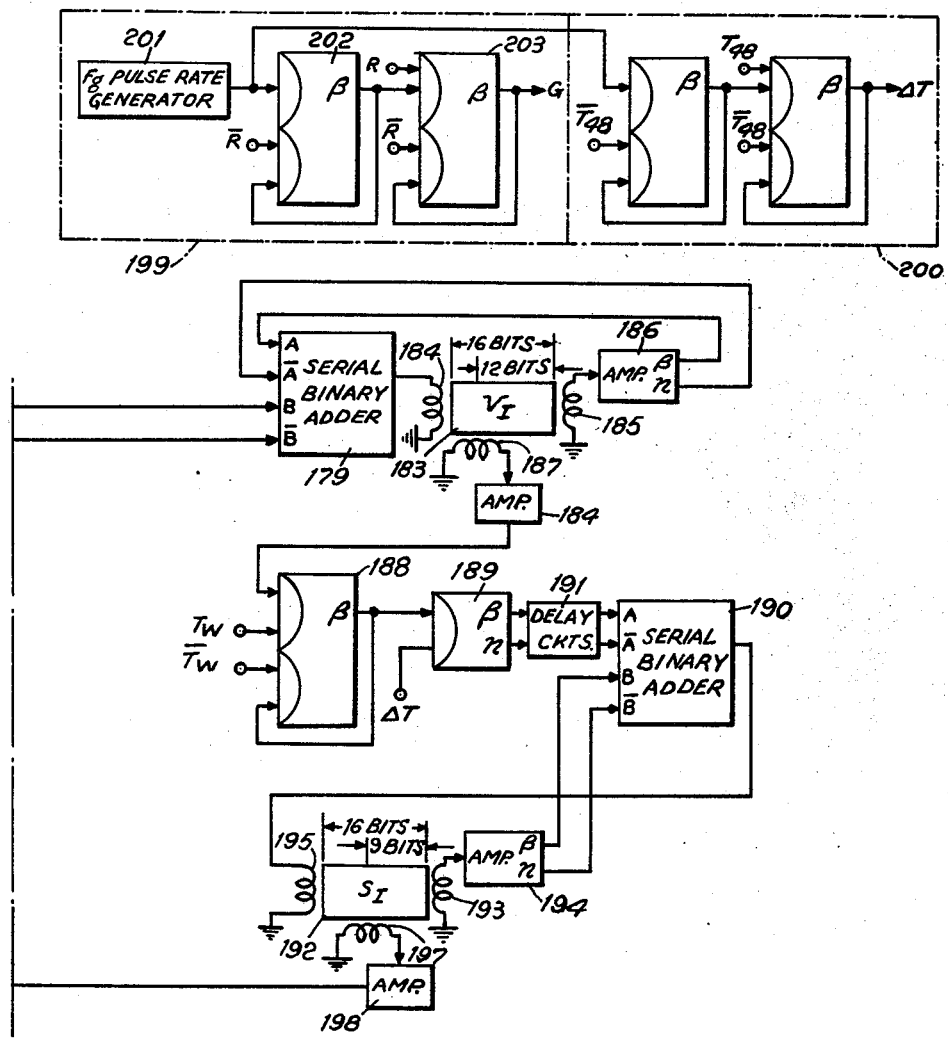
Figure 7A:
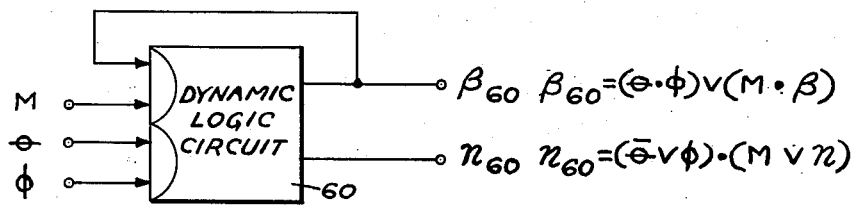
Figure 10B:
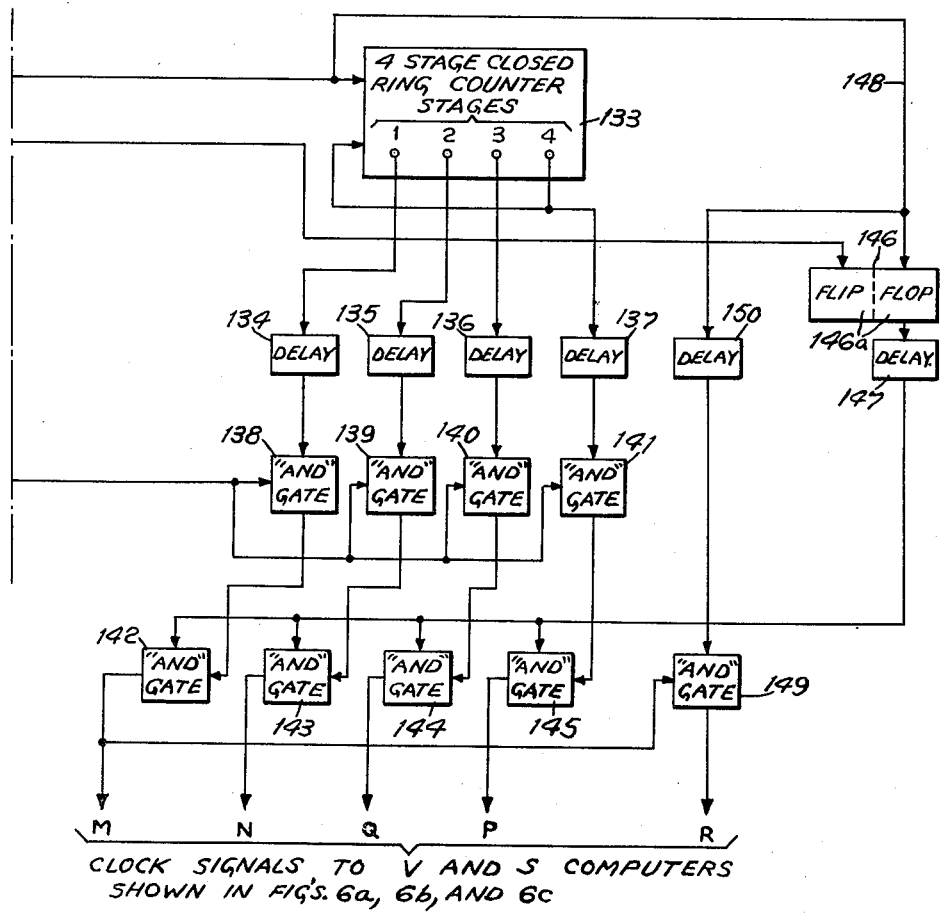

FIGS. 5a, b and c represent block diagrams of a matrix number computer employing dynamic logic circuitry for computing nine numbers representing the attitude of said body;

FIGS. 6a, and 6a', 6b and 6c represent block diagrams of velocity and position computers employing outputs from said matrix computer for computing numbers representing the velocity and position of said body;

FIGS. 7a, b and c show diagrams and waveforms from which an understanding of the operation of a typical dynamic logic circuit may be had;

FIG. 8 shows a partially pictorial view and block diagram of a gyroscope device for providing pulse signals each indicative of a given incremental angle of rotation of said body and providing a signal indicative of the sense of said rotation;

FIG. 9 shows a partially pictorial view and block diagram of an accelerometer device for providing pulse signals each indicative of a given increment of velocity of said body and providing a signal indicative of the sense of said increment and associated buffer circuits;

FIGS. 10a and 10b show a block diagram of the electronic clock for providing numerous types of clock pulses to the matrix and velocity and position computers;

Figure 11A:
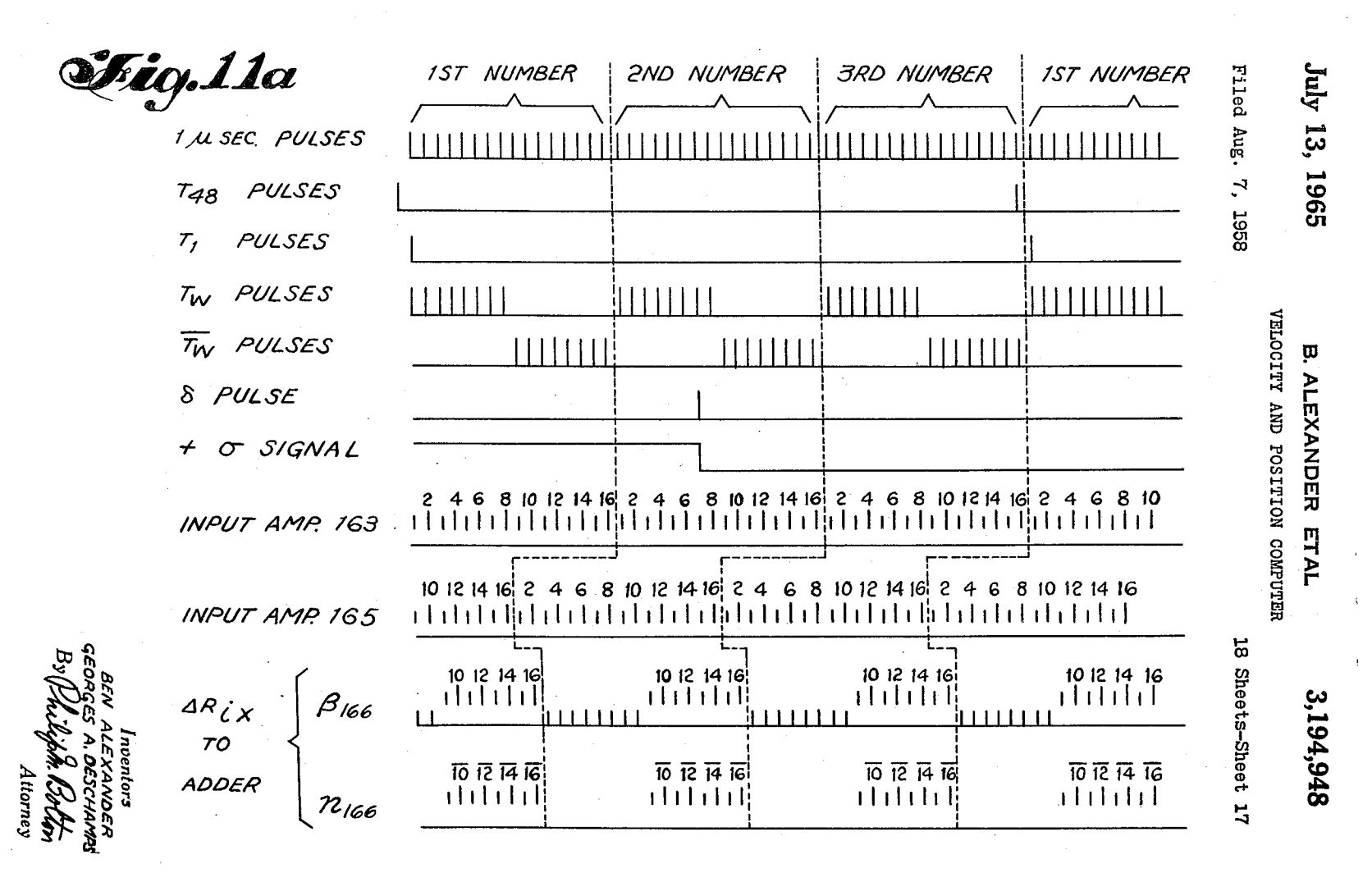

FIGS. 11a and b show waveform diagrams of types of clock pulses and other pulses employed in the matrix and velocity and position computers.

Figure 1:
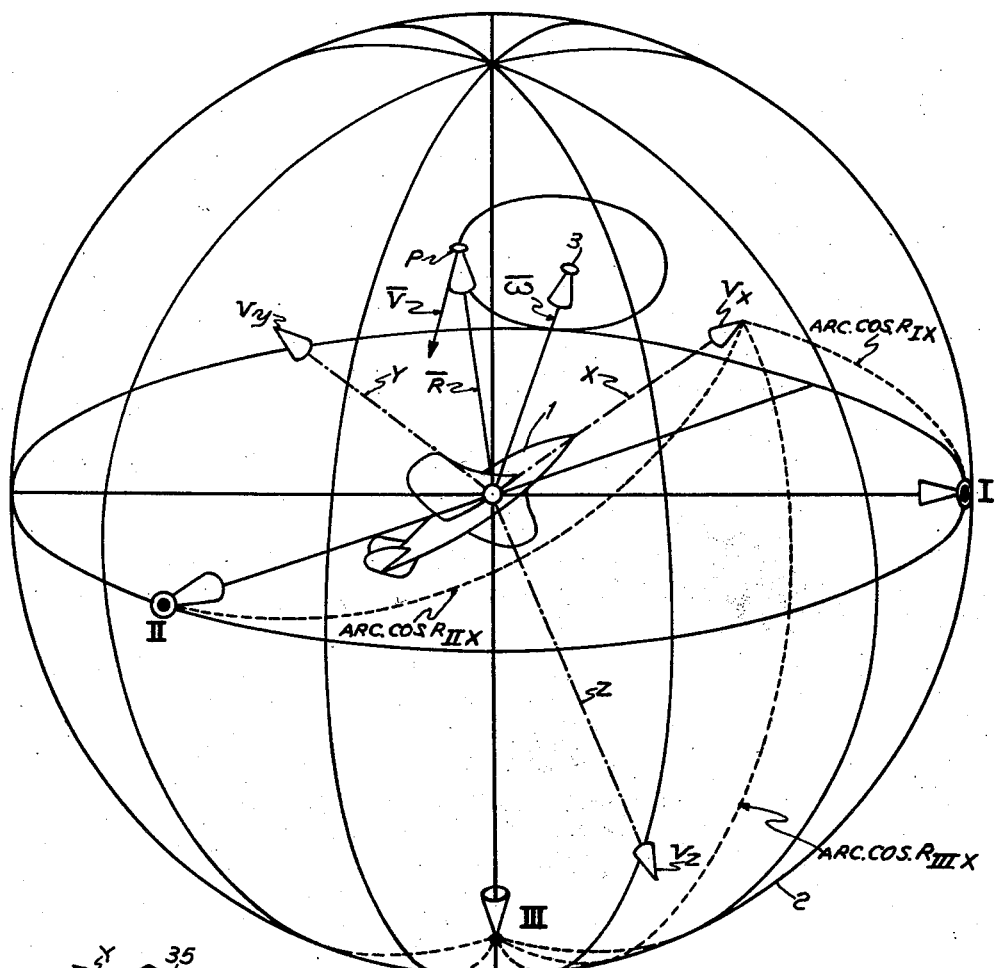
FIGS. 1 and 1a illustrate a spatial orientation of a body with respect to a reference frame and the orientation of gyro and accelerometer sensors in said body.

Turning first to FIG. 1, there is shown a spatial diagram from which an understanding of the theory of the matrix computer may be had. A body, such as a missile or an aircraft 1, is shown having axes $x$, $y$, and $z$ rigidly fixed thereto and extending from the origin O of sphere 2, which is preferably the center of gravity of the body 1, to the surface of sphere 2. Assume that body 1 rotates in three-dimensional space at an angular rate having components in the $x$, $y$, and $z$ directions of $\omega_x$, $\omega_y$, and $\omega_z$. Furthermore, let the angular rate $\omega$ be represented by a vector $\bar{\omega}$ extending from the origin of sphere 2, its line of direction intercepting the surface of sphere 2 at point 3 which is the center of a circle drawn on the surface of sphere 2 and passing through some point P whose location on the surface of sphere 2 relative to the origin O, may be represented by unit vector $\bar{R}$. Obviously, the instantaneous translational velocity of point P on the surface of sphere 2, if R is fixed relative to body 1, may be represented by the vector cross product $\bar{\omega} \times \bar{R}$ as follows:

(A) $\quad\quad\quad\quad \bar{V} = \bar{\omega} \times \bar{R}$

Figure 1A:
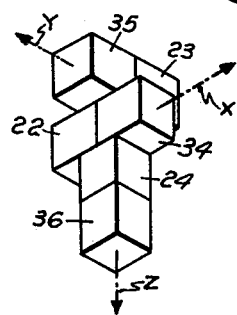

Since $\omega$ may be represented by its components in the directions $x$, $y$, and $z$, namely, $\omega_x$, $\omega_y$, and $\omega_z$, and since $\bar{R}$ may be represented by its components in the directions $x$, $y$, and $z$, namely $R_x$, $R_y$, and $R_z$, the vector cross product may be written as follows:

(B) $\quad \bar{V} = (\omega_y R_z - \omega_z R_y)i + (\omega_z R_x - \omega_x R_z)j + (\omega_x R_y - \omega_y R_x)k$ In matrix notation the above expanded cross product may be represented by a matrix multiplication as follows:

(C) $\quad \begin{bmatrix} V_x \\ V_y \\ V_z \end{bmatrix} = \begin{bmatrix} 0 & -\omega_z & \omega_y \\ \omega_z & 0 & -\omega_x \\ -\omega_y & \omega_x & 0 \end{bmatrix} \begin{bmatrix} R_x \\ R_y \\ R_z \end{bmatrix}$ and the rotation rate matrix may be simplified for expression by the following identity:

(D) $\quad [\omega] = \begin{bmatrix} 0 & -\omega_z & \omega_y \\ \omega_z & 0 & -\omega_x \\ -\omega_y & \omega_x & 0 \end{bmatrix}$ Referring again to FIG. 1, we will now express the velocity of point P in terms of components along axes I, II, and III of a reference frame which is fixed in space and does not rotate as body 1 rotates. Obviously, this may be accomplished by expressing rotational vector $\bar{\omega}$ in terms of rotational components about axes I, II, and III and expressing vector $\bar{R}$ in terms of its projections along axes I, II, and III to yield a matrix equation for the velocity of point P in terms of its components in the directions of axes I, II, and III, denoted $V_I$, $V_{II}$, and $V_{III}$ having the same form as the matrix equation, C, above. However, this obvious method will not be employed in this invention, but rather, another method will be employed whereby the matrix $[\omega]$ expressing the rotational rate of point P about axes $x$, $y$, and $z$ will be retained. This is necessary because in practice the rotation rates $\omega_x$, $\omega_y$, $\omega_z$ are readily available as the outputs from gyroscope rotation sensors fixed to the body 1 and oriented along the lines of axes $x$, $y$, and $z$ of body 1, as shown in FIG. 1a. In order to employ the $[\omega]$ matrix, each of the components $R_x$, $R_y$, and $R_z$ must be expressed in terms of their projections on axes I, II, and III to yield the following matrix equation expressing the projections of each of the velocity vectors $V_x$, $V_y$, and $V_z$ on the axes I, II, and III:

(E) $\quad \begin{bmatrix} V_{Ix} & V_{IIx} & V_{IIIx} \\ V_{Iy} & V_{IIy} & V_{IIIy} \\ V_{Iz} & V_{IIz} & V_{IIIz} \end{bmatrix} = [\omega] \begin{bmatrix} R_{Ix} & R_{IIx} & R_{IIIx} \\ R_{Iy} & R_{IIy} & R_{IIIy} \\ R_{Iz} & R_{IIz} & R_{IIIz} \end{bmatrix}$ The above matrix equation may be written in another algorithm form for convenience of discussion as follows:

(F) $\quad\quad\quad\quad \dot{R} = [\omega] R$

The above algorithm form of the matrix equation may be put in incremental form by rewriting it as the following approximation:

(G) $\quad\quad\quad\quad \Delta R / \Delta t = [\omega] R$ and since $[\omega] \Delta t$ is equivalent to $\delta$ which is the matrix form representing an increment of angle made by the path of point P on the surface of sphere 2 as subtended from the origin O during the interval $\Delta t$, the above may be expressed as follows:

(H) $\quad\quad\quad\quad \Delta R = \delta R$

Since the matrix $\delta$ may be taken similar to the matrix $[\omega]$ to a first approximation it follows:

(I) $\quad \delta = \begin{bmatrix} 0 & \delta_z & -\delta_y \\ -\delta_z & 0 & \delta_x \\ \delta_y & -\delta_x & 0 \end{bmatrix}$ Another more accurate version of the $\delta$ matrix which reduces truncation error is as follows:

$$\delta = \begin{bmatrix} \dfrac{\delta_x^2}{2} & \delta_z & -\delta_y \\ \delta_z & \dfrac{-\delta_x^2}{2} & \delta_x \\ \delta_y & -\delta_x & \dfrac{-\delta_x^2}{2} \end{bmatrix}$$

The truncation error exists because the interval $\Delta t$ is finite and during that interval a rotation of body 1 about, say for example the $x$ axis, will cause a third order change in the value of the projection of the vector $\bar{R}$ on the $x$ axis, denoted herein as $R_x$, and, thus, a third order change in the value of the projection of $R_x$ on the reference axes I, II and III, denoted herein as $R_{Ix}$, $R_{IIx}$ and $R_{IIIx}$, respectively. Obviously, even more accurate matrices for $\delta$ could be employed in place of the approximate matrix shown in Equation I or in place of the third order correction matrix shown directly above; however, in order to simplify the embodiment of this invention herein described, which is adequate for most applications, use of the simpler matrix shown in Equation I will be disclosed in detail.

Referring again to Equation H, an algorithm equation for $\Delta R$ may be written in matrix form as follows:

(J) $\quad \begin{bmatrix} \Delta R_{Ix} & \Delta R_{IIx} & \Delta R_{IIIx} \\ \Delta R_{Iy} & \Delta R_{IIy} & \Delta R_{IIIy} \\ \Delta R_{Iz} & \Delta R_{IIz} & \Delta R_{IIIz} \end{bmatrix} = \delta \begin{bmatrix} R_{Ix} & R_{IIx} & R_{IIIx} \\ R_{Iy} & R_{IIy} & R_{IIIy} \\ R_{Iz} & R_{IIz} & R_{IIIz} \end{bmatrix}$ Next, performing the matrix multiplication on the right-hand side of matrix Equation J, the following nine simultaneous equations, one for each $\Delta R_{ij}$ are obtained:

(K) $\quad \Delta R_{Ix} = \delta_y R_{Iz} - \delta_z R_{Iy}$
$\quad\quad\quad \Delta R_{IIx} = \delta_y R_{IIz} - \delta_z R_{IIy}$
$\quad\quad\quad \Delta R_{IIIx} = \delta_y R_{IIIz} - \delta_z R_{IIIy}$
$\quad\quad\quad \Delta R_{Iy} = \delta_z R_{Ix} - \delta_x R_{Iz}$
$\quad\quad\quad \Delta R_{IIy} = \delta_z R_{IIx} - \delta_x R_{IIz}$
$\quad\quad\quad \Delta R_{IIIy} = \delta_z R_{IIIx} - \delta_x R_{IIIz}$
$\quad\quad\quad \Delta R_{Iz} = \delta_x R_{Iy} - \delta_y R_{Ix}$
$\quad\quad\quad \Delta R_{IIz} = \delta_x R_{IIy} - \delta_y R_{IIx}$
$\quad\quad\quad \Delta R_{IIIz} = \delta_x R_{IIIy} - \delta_y R_{IIIx}$ If each value of R at an instant of time $t$ may be expressed by matrix $(R_{ij})_t$, then matrix $(R_{ij})_{t+1}$ is expressed as follows:

(L) $\quad\quad\quad (R_{ij})_{t+1} = (R_{ij})_t + (\Delta R_{ij})_{t+1}$

Each value of A at the time $t+1$, denoted generally as $(R_{ij})_{t+1}$, may be expressed by one of the following nine simultaneous equations:

(M')
$$(R_{Ix})_{t+1} = (R_{Ix})_t + (\Delta R_{Ix})_{t+1}$$
$$(R_{IIx})_{t+1} = (R_{IIx})_t + (\Delta R_{IIx})_{t+1}$$
$$(R_{IIIx})_{t+1} = (R_{IIIx})_t + (\Delta R_{IIIx})_{t+1}$$
$$(R_{Iy})_{t+1} = (R_{Iy})_t + (\Delta R_{Iy})_{t+1}$$
$$(R_{IIy})_{t+1} = (R_{IIy})_t + (\Delta R_{IIy})_{t+1}$$
$$(R_{IIIy})_{t+1} = (R_{IIIy})_t + (\Delta R_{IIIy})_{t+1}$$
$$(R_{Iz})_{t+1} = (R_{Iz})_t + (\Delta R_{Iz})_{t+1}$$
$$(R_{IIz})_{t+1} = (R_{IIz})_t + (\Delta R_{IIz})_{t+1}$$
$$(R_{IIIz})_{t+1} = (R_{IIIz})_t + (\Delta R_{IIIz})_{t+1}$$

In this invention the typical numbers $R_{ij}$ expressed in Equations M' will be represented as binary numbers in a computer. Thus, nine such numbers will be represented in the computer in binary form and gyroscope device signals $\delta_x$, $\delta_y$, and $\delta_z$ will represent equal increments of angles of rotation of body 1 about its axes $x$, $y$, and $z$ (see FIG. 1). These increments are chosen to be a power of 2 so that multiplication of $R_{ij}$ by $\delta_x$, $\delta_y$ or $\delta_z$, shown in Equations K, becomes a shifting process to shift each value of $R_{ij}$ a number of places determined by said power when multiplied by a $\delta$ pulse from a gyroscope device. In the embodiment of this invention herein described, a single $\delta$ pulse from a gyroscope device has been chosen for purposes of illustration to indicate a rotational angle of $2^{-6}$ radians. Obviously, system accuracy can be improved by decreasing the angle represented by a single $\delta$ pulse; for example, each pulse might represent a rotation of body 1 about one of its axes of $2^{-13}$ radians.

The effect of a $\delta$ pulse representing an increment of rotation of the $x$, $y$, or $z$ axes upon the nine numbers $R_{ij}$ expressed in Equations M' is charted in FIG. 2. It will be seen that the chart names three increments of rotation $\delta_x$, $\delta_y$, and $\delta_z$, and that opposite *each* increment of rotation there are nine boxes. Considering only the top group of nine boxes (those opposite $\delta_x$), each of these boxes represents a different one of the $R_{ij}$ numbers. Thus, for example, the box in Column I, row $y$, represents $R_{Iy}$. The term $(-2^{-6}R_{Iz})$ inside the box $R_{Iy}$ represents the change in $R_{Iy}$ due to increment of rotation $\delta_x$. In similar fashion, the nine $R_{ij}$ numbers are represented by the nine boxes opposite $\delta_y$ and again by the nine boxes opposite $\delta_z$, and the term inside each of these boxes represents the change in the number whose box is occupied, the change being in response to a pulse representing an increment $\delta_y$ or $\delta_z$ of rotation around the corresponding axis. It will be seen from the chart that a $\delta_x$ pulse will produce no change in the numbers $R_{Ix}$, $R_{IIx}$, $R_{IIIx}$. It will further be seen that, there is a subtraction from $R_{Iy}$ of a weighted portion of the value of $R_{Iz}$. The same pulse will cause an addition to $R_{Iz}$ which is equal to the same fraction of $R_{Iy}$. Further inspection of the chart in FIG. 2 will show that for the same $\delta_x$ pulse, there is a similar subtraction from $R_{IIy}$ and $R_{IIIy}$ and a similar addition to the $R_{IIz}$ and $R_{IIIz}$. For a $\delta_y$ pulse, representing an increment of rotation around the $y$ axes, there is a similar process of addition and subtraction occurring between $R_{Ix}$ and $R_{Iz}$, and $R_{IIx}$ and $R_{IIz}$ and $R_{IIIx}$ and $R_{IIIz}$ and for a $\delta_z$ pulse, there is a similar subtraction and addition between the numbers having $x$ and $y$ subscripts as likewise shown in the chart.

In the above chart, it is presupposed that the increments of rotation, that is, the $\delta_x$, $\delta_y$, and $\delta_z$ are positive. If they are negative, the signs inside the boxes are reversed. After the computer for carrying out the functions indicated in the chart, FIG. 2, has been initially aligned, the successive $\delta$ pulses will change the numbers $R_{ij}$ in the computer in accordance with the rotation of the $x$, $y$, and $z$ axes so that the nine numbers will continuously represent the attitude of the $x$, $y$, and $z$ axes with respect to the reference frame I, II, and III axes (see FIG. 1).

Figure 3:
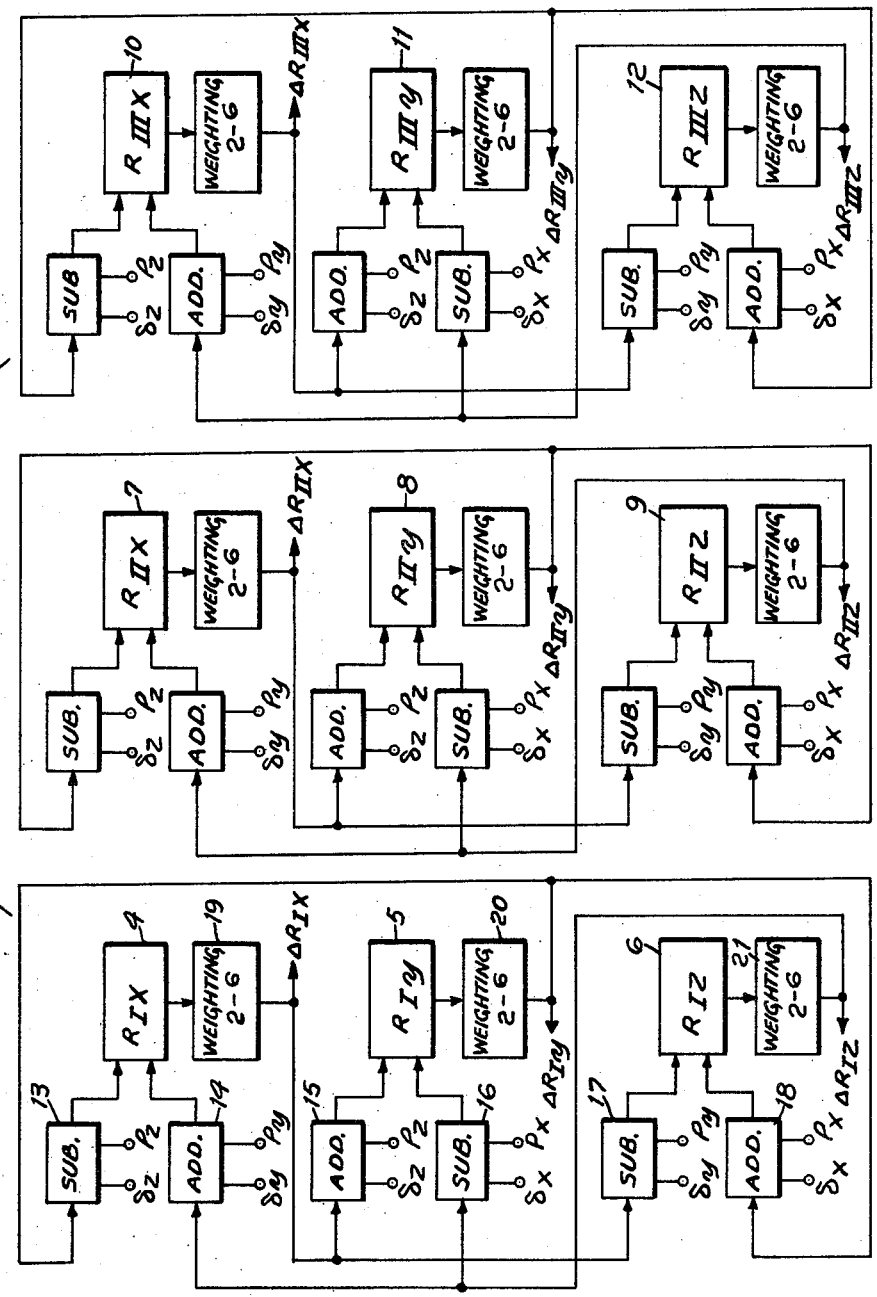
FIG. 3 is a block diagram showing the general method of computing and storing matrix numbers representing attitude.

Generally, the matrix computer will perform the operations of FIG. 2 by apparatus which performs the functions indicated in FIG. 3. Referring now to FIG. 3, each one of the nine numbers, $R_{ij}$, may be stored numbers in a separate register designated as 4 to 12, respectively. These may be in binary form and the registers may be, for example, either magnetic drums, pulse recirculating storage registers, etc. Since the circuitry connecting registers 4, 5, and 6 is the same as that connecting 7, 8, and 9, or 10, 11, and 12, a brief descripiton of the circuitry connecting registers 4, 5, and 6 will suffice. When a $\delta$ pulse arrives accompanied by its associated $\rho$ signal which indicates the sign of the $\delta$ pulse, and said $\rho$ signal indicates positive, there is an addition made to one of the registers and a subtraction from another of the registers. This addition and subtracting may of course be reversed if said $\rho$ signal indicates negative. Such additions and subtractions to the number in each register 4, 5, and 6 are made by devices 13 to 18, each of which is designated "subtract" or "add" to indicate its function in response to the $\delta$ pulse controlling it, when that $\delta$ pulse is positive as indicated by its associated $\sigma$ signal. The inputs to devices 13 to 18, which are indicative of the numbers to be added or subtracted to registers 4, 5, or 6, are obtained from weighting devices 19, 20, and 21 coupled to registers 4, 5, and 6, respectively. The function of each of these weighting devices is to read the number in the register to which it is coupled without altering said number and to weight the read number by effectively multiplying it by a factor equivalent to the value of a single $\delta$ pulse. For example, each $\delta$ pulse may represent a rotation of body 1 about one of its axes of $2^{-6}$ radians and the numbers in registers 4 to 12 may be represented in serial binary form by 16 binary bits, the least significant bit first and the last bit representing the sign of the number; thus, the action of each of weighting devices 19, 20, and 21 is to alter the significance of each binary bit by reducing its significance six binary places. In other words, a negative number in a register represented in binary notation, least significant bit first, as 1010110010110011 would be weighted as 0010110011.

With the above being understood, it can readily be seen how the system of FIG. 3 operates in accordance with the chart of FIG. 2 when a $\delta$ pulse is received. The $\delta$ pulses and $\sigma$ signals are derived from gyroscope devices such as shown in FIG. 8 in response to the output from single degree of freedom gyroscopes 22, 23, and 24, shown in FIG. 1a, which are sensitive to rotations of body 1 about its axes $x$, $y$, and $z$, respectively. Assuming for the moment that a positive $\delta_x$ pulse is received from a device responsive to gyro 22, this will actuate the "subtract" device 16 and the "add" device 18 feeding registers 5 and 6. A weighted portion of the coefficient $R_{Iz}$ in register 6 will be subtracted from the coefficient $R_{Iy}$ in register 5 while at the same time, the same $\delta_x$ pulse will actuate device 18 causing a weighted portion of $R_{Iy}$ in register 5 to be added to the coefficient $R_{Iz}$ in register 6. It will be seen that this corresponds to the operations indicated by the chart in FIG. 2. The same actions, in response to a $\delta_x$ pulse, will occur between registers 8 and 9 and 11 and 12, thereby changing the value of their corresponding coefficients. For a $\delta_y$ pulse, the "add" and "subtract" devices 14 and 17 will operate in accordance with the indication of FIG. 2, and for a $\delta_z$ pulse, devices 13 and 15 will operate in accordance with the corresponding indications of FIG. 2. The additions and subtractions produced by the $\delta$ pulses in registers 4, 5, and 6, as hereinabove described, will also occur in registers 7 through 12 in a similar manner as indicated in the chart of FIG. 2. Therefore, assuming that the registers are initially aligned so that the numbers $R_{ij}$ properly represent the orientation of the $x$, $y$, and $z$ axes, with respect to the reference frame, thereafter, as rotations of the body about axes $x$, $y$, $z$ occur, the registers will change as heretofore indicated and continue to show the orientation of the $x$, $y$, and $z$ axes with respect to the reference frame. The nine outputs from the general matrix computer system shown in FIG. 3 are the nine weighted or incremental numbers $\Delta R_{ij}$ which are fed to a velocity and position computer.

Figure 4:
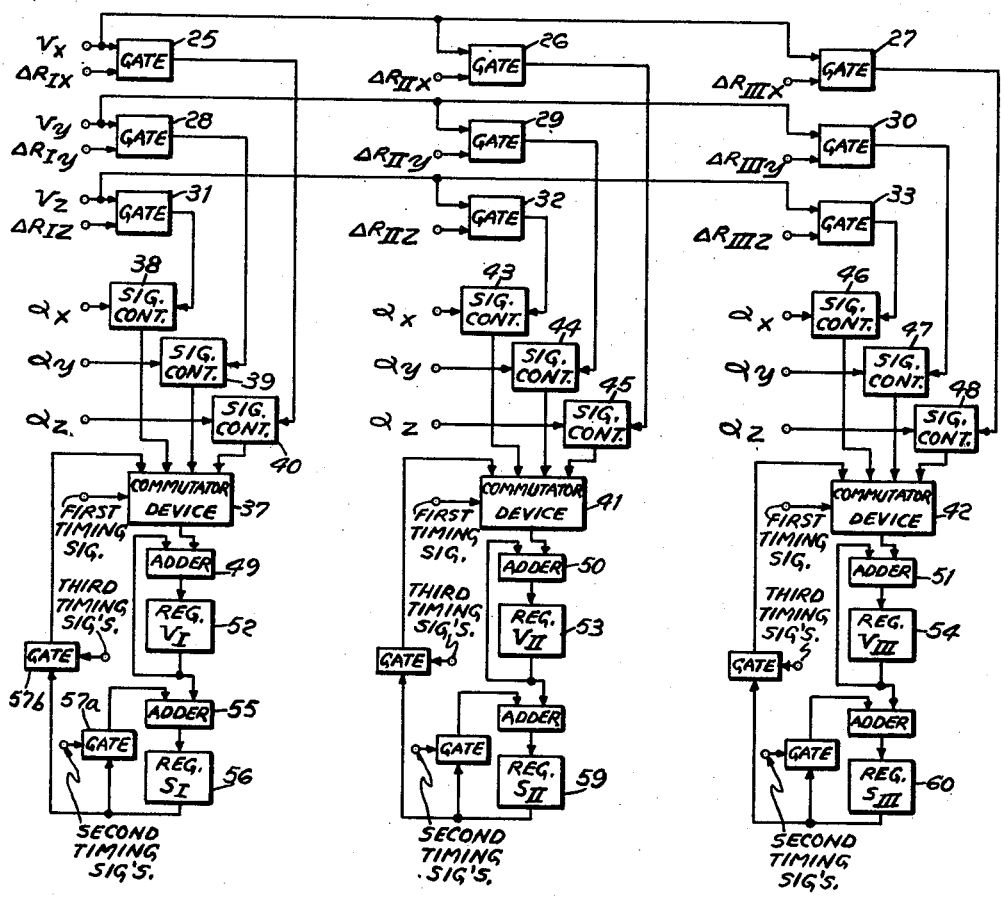
FIG. 4 is a block diagram showing the general method of computing and storing numbers representing velocity and position of said body.

Generally, the velocity and position computer will perform the functions indicated in FIG. 4. Referring to FIG. 4, there are shown nine gates 25 to 33 each serving to gate a different one of the nine incremental numbers $\Delta R_{ij}$. Different groups of three of these gates are responsive to different incremental velocity pulses denoted as $v_x$, $v_y$, or $v_z$ pulses. These $v_x$, $v_y$, and $v_z$ pulses each represent equal increments of velocity of body 1 parallel to its axes $x$, $y$, and $z$, respectively, and each is accompanied by an associated $\alpha$ signal indicating the sense or direction of the $v$ pulse. Thus, sign signals $\alpha_x$, $\alpha_y$, and $\alpha_z$ indicate the sense or direction of incremental velocity pulses $v_x$, $v_y$, and $v_z$, respectively. The $v_x$, $v_y$, and $v_z$ pulses and their associated $\alpha$ signals are derived from accelerometer devices such as shown in FIG. 9 in response to inertia sensors 34, 35 and 36, shown in FIG. 1a, which are sensitive to accelerations of body 1 in directions parallel to its axes $x$, $y$, and $z$, respectively. As shown in the figure, gates 25, 26 and 27 are controlled by $v_x$ pulses, gates 28, 29 and 30 are controlled by $v_y$ pulses and gates 31, 32, and 33 are controlled by $v_z$ pulses. Gates 25, 28 and 31 feed incremental numbers $\Delta R_{Ix}$, $\Delta R_{Iy}$, and $\Delta R_{Iz}$ to commutator device 37 via sign control devices 38, 39, and 40, respectively, while gates 26, 29 and 32 feed commutator 41 and gates 27, 30, and 33 feed commutator 42 via similar sign control devices 43 to 48. These commutator devices are controlled by first timing signals (clock signals M, N, Q, and P in FIG. 10b) and the sign control devices each serve to reverse the sign of the associated number $\Delta R_{ij}$ when its $v$ control pulse is negative so that commutator devices 37, 41 and 42 sequentially feed incremental numbers of the form $\Delta R_{Ij}$, $\Delta R_{IIj}$, and $\Delta R_{IIIj}$, respectively, to adders 49, 50, and 51, respectively. Adders 49, 50, and 51 are also fed the numbers representative of $V_I$, $V_{II}$, and $V_{III}$ from registers 52, 53, and 54, respectively, and the output of each of these adders, in turn, feeds its associated register as shown in the figure so that the numbers $V_I$, $V_{II}$, and $V_{III}$ continually represent the velocity of body 1 in the direction of reference frame axes I, II, and III, respectively.

Displacement or position of body 1 in the reference frame is expressed by numbers $S_I$, $S_{II}$, and $S_{III}$ which represent distances in the direction of axes I, II, and III, respectively. The number $S_I$ may be obtained from register 52, wherein is stored $V_I$, by the integrating action of adder 55, register 56, and gate 57a. Gate 57a is controlled by second timing signals (clock signals $\Delta T$ in FIG. 6a') whereby the number $S_I$ from register 56 is fed to adder 55 at regular intervals where it is added to the number $V_I$ from register 52 so that register 56 continuously stores the number $S_I$ representative of the distance traveled by body 1 parallel to reference frame axis I. The number $S_I$ from register 56 is also fed to commutator device 37 via gate 57b at intervals controlled by third timing signals (clock signals G in FIG. 6a') to account for acceleration and resulting velocity increments due to gravity. The relationships between $S_I$ and gravity are described herein with reference to FIG. 6a. Similar systems are coupled to the output of registers 53 and 54 to compute and store, in registers 58 and 59, the numbers $S_{II}$ and $S_{III}$, respectively.

The various functions indicated in FIGS. 3 and 4 may be performed in many ways using, for example, static or dynamic logic circuitry. The systems shown in these figures have many redundancies of equipment, such as a multiplicity of adders, subtracters, gates and registers, etc., many of which can be eliminated in more sophisticated arrangements. One form of such an arrangement to compute the numbers $R_{ij}$ is described in FIGS. 5a, 5b and 5c wherein is shown a matrix computer comprising dynamic logic circuits controlled by various timing pulses from an electronic clock to perform the functions hereinabove described with reference to FIG. 3, and three magnetostrictive storage devices to store the numbers $R_{ij}$ in serial binary form and responsive to gyroscope devices having gyros fixed to the $x$, $y$, and $z$ axes of a body, such as shown in FIG. 1a. These pulses from the gyroscope devices initiate additions to and subtractions from the nine numbers $R_{ij}$ as prescribed by the nine equations M′ and shown by the chart in FIG. 2. One form of an arrangement for computing velocities $V_I$, $V_{II}$, and $V_{III}$ and displacements $S_I$, $S_{II}$, and $S_{III}$ is shown in FIGS. 6a, 6b, and 6c wherein are shown dynamic circuits responsive to the outputs from accelerometer devices such as shown in FIG. 9 and to the incremental numbers $\Delta R_{ij}$ from the matrix computer. There are shown adders feeding a first set of three magnetostrictive type storage devices storing serial binary numbers indicative of $V_I$, $V_{II}$ and $V_{III}$. An output from each of these storage devices feeds into a different one of a second set of three adders each of which feeds one of a second set of three magnetostrictive storage devices wherein are stored distances or displacements $S_I$, $S_{II}$ and $S_{III}$.

Figure 7B:
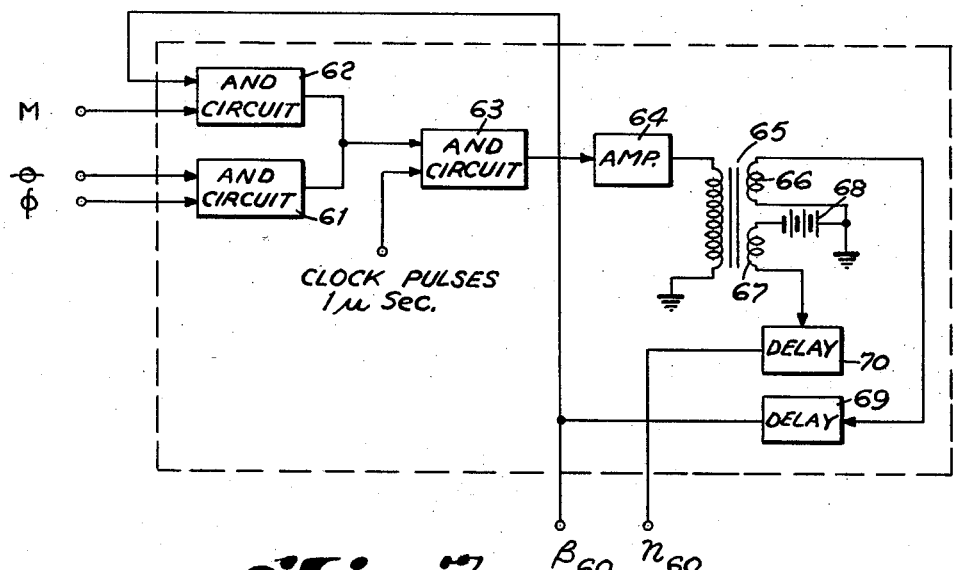
Figure 7C:
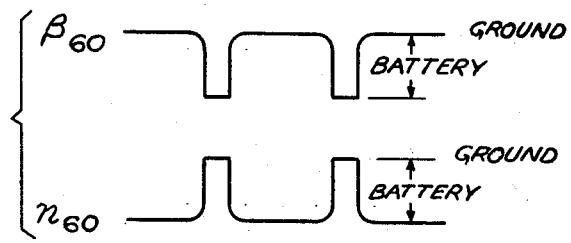

The operation of a typical one of the numerous dynamic logic circuits comprising the matrix and velocity and position computers can be understood with reference to the details of such a circuit shown in FIGS. 7a, 7b, and 7c, while the operation of a typical one of the gyroscope devices shown in FIGS. 5a, 5b and 5c may be understood with reference to the details of such a device shown in FIG. 8, and the operation of a typical one of the accelerometer devices shown in FIGS. 6a, 6b and 6c may be had by reference to FIG. 9. The electronic clock may be understood by reference to FIG. 10, which is a system diagram, and FIGS. 11a and 11b, which depicts various clock output waveforms and matrix computer waveforms.

Referring next to FIG. 7a, there is shown a typical dynamic logic circuit 60 which is typical of those represented in FIGS. 6′, 6a′, 6b, 6c, 5a, 5b, 5c and 9 having an assertive output $\beta_{60}$ and a negative output $\eta_{60}$. The external inputs to circuit 60, for example, $\theta$, $\phi$ and M may be intermittent, continuous or otherwise pulsed signals, and the logic performed by this circuit is expressed by the equations for $\beta_{60}$ and $\eta_{60}$ shown at FIG. 7a. The same dynamic logic circuit 60 is shown in detail in FIG. 7b comprising input "and" circuits 61 and 62, each of which produces a single pulse output in response to simultaneously receiving pulses or signals from the different inputs coupled thereto. The "and" circuit 62 is fed $\beta_{60}$ and M pulses, while "and" circuit 61 is fed $\theta$ and $\phi$ signals. The outputs of circuits 61 and 62 are coupled together and fed to a similar "and" circuit 63 which is continuously fed one megacycle clock pulses, $T_n$, from the electronic clock described herein with reference to FIG. 10a, so that said clock pulses appear at the output of circuit 63 when they are in coincidence with the output of circuits 61 or 62. The output of "and" circuit 63 is fed to amplifier 64 whose pulse output is fed to transformer 65 having two secondary windings 66 and 67 coupled together by battery 68 one terminal of which is grounded. The outputs from windings 66 and 67 are fed to delay circuits 69 and 70, respectively, serving to delay pulses from their respective coils to yield output pulses $\beta_{60}$ and $\eta_{60}$ which are synchronized with the next clock pulse. A waveform diagram of $\beta_{60}$ and $\eta_{60}$ is shown in FIG. 7c from which it may be seen that while $\beta_{60}$ is at ground potential between pulses, $\eta_{60}$ is at battery 68 voltage and subsequently when $\beta_{60}$ swings toward battery 68 voltage in response to a pulse output from amplifier 64, $\eta_{60}$ swings toward ground. In other words, an approximate ground potential output at terminal $\beta_{60}$ indicates that the logic equation for $\beta_{60}$ shown in FIG. 7a is not satisfied whereas battery 68 voltage output at terminal $\eta_{60}$ indicates that the logic equation for $\eta_{60}$ is satisfied. On the other hand, the converse of these conditions exist at terminal $\beta_{60}$.

Consider next the operation of a typical one of the gyroscope devices 71, 72, or 73 shown as inputs to FIGS. 5a, 5b and 5c, say for example device 71 which produces $\delta_x$ clock pulses and a $\sigma_x$ clock pulses in response to rotations of body 1 about its $x$ axis. Referring to FIG. 8, there are shown the details of device 71 comprising a single degree of freedom gyroscope 22, preferably fixed to body 1, as also shown in FIG. 1a, so that a rotation of body 1 about its $x$ axis causes the gyroscope housing 74 to precess on bearing 75 and 76 supporting axle 77 which is oriented in the $y$ axis direction and preferably concentric with the $y$ axis. The precession angle of the gyroscope is detected as a phase shift of a 1 kc. signal induced in rotor coil 78, fixed to one end of axle 77, by stator coil 79. This phase shifted 1 kc. signal is fed from rotor coil 78 via brush 80 to amplifier 81 and in turn to phase comparing network 82 where it is phase compared with the signal from a 1 kc. oscillator 83 which also energizes coil 79. The output of network 82 is a pulsating D.C. signal whose D.C. sign and magnitude are indicative of the phase difference between input signals. This output is filtered by 1 kc. filter 84 and fed to chopper 85 which is controlled by sampling pulse generator 86 generating 1 kc. chopper pulses in response to the output of 1 kc. oscillator 83. The chopped D.C. output signal from chopper 85 is then fed to each of similar reference voltage multivibrators 87 and 88 which are also fed D.C. signals from battery 89, multivibrator 87 being fed a positive voltage from battery 89 and multivibrator 88 being fed a negative voltage from battery 89. The design and operation of multivibrators 87 and 88 may be as described on page 343, volume 19 of Radiation Laboratory Series published by McGraw-Hill. These multivibrators each produce a signal pulse output upon receiving a pulse from chopper 85 which is, in the case of multivibrator 87, more positive than the positive battery voltage fed to multivibrator 87 or, in the case of multivibrator 88, more negative than the negative battery voltage fed to multivibrator 88. The output of multivibrator 87 energizes bistable flip-flop circuit 90, and the output of multivibrator 88 energized bistable flip-flop circuit 91. Each of these flip-flop circuits, 90 and 91, are reset simultaneously by a signal from standard pulse generator 92 via delay circuit 93. The outputs of one stage of flip-flop circuits 90 and 91 are coupled to and controlled by "and" gates 94 and 95 which gate pulses from standard pulse generator 92 and feed said gated pulses to one end or the other of torquing coil 96 which is inductively coupled to magnet 97 fixed to axle 77, thereby torquing said axle. Thus, the output of chopper 85 consisting of positive or negative pulses causes multivibrators 87 and 88 to energize flip-flop circuits 90 and 91, respectively, when said pulses from chopper 85 exceed predetermined voltage values determined by battery 89, and when flip-flop circuits 90 and 91 are energized, gates 94 or 95 are opened allowing a signal pulse from standard pulse generator 92 to be applied to one side or the other of torquing coil 96 causing axle 77 to be torqued in such a direction as to oppose the tendency of gyroscope housing 74 to precess in response to a rotation of body 1 about the $x$ axis. The outputs of "and" gates 94 and 95 are also fed to "or" gate circuit 98 whose output signal consists of $\delta_x$ pulses which are fed to the matrix computer shown in FIG. 5a. The sign of the $\delta_x$ pulse is represented by the signal output $\sigma_x$ from one stage of bistable flip-flop circuit 99, which is also coupled to the outputs of "and" gates 94 and 95.

Referring next to FIG. 9, there is shown details of a typical one of the three accelerometer devices 103, 104 and 105 shown in FIGS. 6a, 6b and 6c responsive to inertia sensors 34, 35 and 36 for providing $v_x$, $v_y$ and $v_z$ clock pulses, indicative of the occurrence of an increment of acceleration of body 1, and $\alpha_x$, $\alpha_y$ and $\alpha_z$ clock pulses indicative of the sign of that acceleration. Since these devices operate identically, only device 103 producing $v_x$ and $\alpha_x$ clock pulses will be described. The inertia sensor 34 responsive to accelerations of body 1 parallel to its $x$ axis produces a D.C. signal whose magnitude and sign represent the magnitude and sign of said acceleration. Accelerometers 34, 35, and 36 yielding D.C. signals may be for example of the single degree of freedom spring retained type, shown in FIG. 9, or any other suitable design known to the art producing a D.C. signal indicative of acceleration. The D.C. output signal from accelerometer 34 is fed to reactance circuit 106 of 10 kc. oscillator 107 to control the frequency of said oscillator so that the frequency of oscillator 107 is indicative of acceleration. The signal output of oscillator 107 is shaped by squaring circuit 108a which may be, for example, a cathode coupled double ended clipper circuit. The output of circuit 108a is fed to differentiating circuit 109a which produces positive and negative spikes.

A stable 10 kc. oscillator 110, which preferably has a piezoelectric quartz crystal as its resonant circuit, feeds another squaring circuit 108b which in turn feeds another differentiating circuit 109b producing positive and negative peaks. The positive peaks from circuit 109b are at a repetition rate of 10 kc. while the positive peaks from circuit 107 are at a repetition rate of 10 kc. plus or minus the frequency change produced by the effects of an acceleration of body 1 parallel to its $x$ axis. The outputs from circuits 109a and 109b are applied to different sides of double input bistable flip-flop circuit 111 so that positive peak signals from circuit 109a cause stage 111a to conduct while positive peak signals from circuit 109b cause stage 111b to conduct. Circuits 109a and 109b also feed spike signals to "and" gates 112a and 112b, respectively, and these gates are controlled by stages 111a and 111b, respectively, so that when the frequency of oscillator 107 is higher than 10 kc., positive pulses will be passed by gate 112a at regular intervals and said interval will vary directly with the frequency difference between the outputs from oscillator 107 and 10 kc. crystal oscillator 110. Similarly, when the frequency of oscillator 107 is lower than 10 kc., positive pulses will be passed by gate 112b at regular intervals depending on the frequency difference in signals from said oscillators. The response of reactance circuit 106 and, thus, oscillator 107, to a D.C. voltage from accelerometer 34 is such that an acceleration of body 1 in the direction of the axis $x$ causes an increase in the frequency of oscillator 107 over and above 10 kc. which is its frequency when the input to the reactance circuit is ground and said increase in frequency is directly proportional to said acceleration.

The output of gates 112a and 112b are coupled via diodes 113a and 113b, respectively, yielding $v_x$ pulses each representative of equal increments of velocity of body 1 in its $x$ direction. Each of these outputs are also fed to different stages of double input bistable flip-flop circuit 114 so that sign signal $\alpha_x$ indicates that the last $v_x$ pulse represents a positive increment of velocity (in the direction of axis $x$) when stage 114a of flip-flop circuit 114 conducts. The $v_x$ pulses are fed via line 115 to dynamic buffer circuits 116 and 117 each of which operates as does the typical dynamic circuit described hereinabove with reference to FIGS. 7a, b and c. Dynamic circuit 116 is also fed one megacycle $\overline{R}$ clock pulses (see FIG. 11b) and its own affirmative, $\beta$, output. Thus, the affirmative, $\beta$, output from circuit 116 consists of a string of one megacycle clock pulses, following the occurrence of a $v_x$ pulse and before the occurrence of the next R pulse and this $\beta$ output is fed to dynamic circuit 117 as are also R and $\overline{R}$ pulses and the $\beta$ output from circuit 117 so that the $\beta$ output of circuit 117 consists of a string of one megacycle pulses between successive R pulses following a $v_x$ pulse from gates 112a or 112b and this string is referred to as $v_x$ clock pulses. Meanwhile the signal from stage 114a signifying that said $v_x$ pulse is positive is applied via line 118 to dynamic circuit 119 as are also the $\beta$ output from 117, R clock pulses, $\overline{R}$ pulses and the $\beta$ output from 119 so that the $\beta$ output from circuit 119 consists of a string of one megacycle pulses occurring between the same successive R pulses, as the $\beta$ output from circuit 117, provided the $v_x$ pulse applied via line 110 represents a positive increment of velocity of body 1. It should be noted that the one megacycle pulses from a $\beta$ output are as shown in FIG. 7c; thus, when stage 114b of flip-flop circuit 114 conducts, indicating that the $v_x$ pulse in line 115 represents a negative increment of velocity of body 1, the $\beta$ output from dynamic circuit 119 is a continuous ground signal while the negative, $\eta$, output from 119 is at battery voltage continuously.

Referring next to FIGS. 10a and 10b and 11a and 11b, there is shown a block diagram of the electronic clock and waveform diagrams of some of the pulses issuing therefrom and employed in the matrix computer. The clock shown in FIGS. 10a and 10b is comprised of a 1 megacycle oscillator 120 feeding a pulse generator 121 producing 1 $\mu$sec. spaced pulses which is the basic clock pulse rate. Hereinafter referred to as $T_n$. These clock pulses are continuously fed to all the dynamic logic circuits in the manner hereinabove described with reference to FIG. 7b. The output from pulse generator 121 is fed to ring counter 122 having forty-eight stages, the output of each stage being denoted by numbers 1 to 48 some of which are shown as output terminals from 122. Ring counter 122 may be similar to the device shown at the bottom of page 343 of Millman and Taub, "Pulse and Digital Circuits" published 1956 by McGraw-Hill, except that the ring counter employed in this invention must have many more stages than shown in the reference. The outputs from stages 1, 8, 16, 24, 32, and 40 of ring counter 122 are each fed via diodes 123 to single input bistable flip-flop circuit 124 so that one side, say for example, 124a of flip-flop circuit 124, produces an output signal in response to an output from stages 1, 16, and 32 of ring counter 122 and the other side of flip-flop circuit 124, say for example 124b, produces an output signal each time stages 8, 24, and 40 of ring counter 122 are caused to conduct. The outputs from 124a and 124b are fed to "and" circuits 125 and 127, respectively, via delay circuits 127 and 128, respectively. These "and" circuits serve to gate pulses from pulse generator 117 to yield the $T_w$ and $\overline{T}_w$ clock pulses shown in the waveform diagram FIG. 11a and discussed with reference to matrix computer shown in FIG. 5. Delay circuits 127 and 128 serve to delay the openings of "and" gates 125 and 126 in response to signals from stages 1, 16 and 32 and signals from stages 8, 24 and 40, respectively, so that these gates open one $\mu$sec. after the signals from their associated stages of counter 122. The output of stage 48 of ring counter 122 is fed back to the input of stage 1 of ring counter 122 to condition stage 1 so that the next pulse from pulse generator 121 will begin another count of the ring counter. The output of stage 48 is also fed to control "and" gate 129 via delay circuit 130; thus, "and" gate 129 serves to pass every forty-eighth pulse from pulse generator 121. The output from stage 1 of ring counter 122 serves to control "and" gate 131 to which it is fed via delay circuit 132; thus, gate 131 passes every first pulse from pulse generator 121 thereby supplying $T_1$ clock pulses to the matrix computer. The outputs from gates 129 and 131 are fed to and control "inhibit" circuits 129a and 131a respectively, serving to inhibit one megacycle clock pulses fed thereto each time a $T_{48}$ and $T_1$ pulse, respectively, occurs. Thus the output from "inhibit" circuits 129a and 131a denoted $\overline{T}_{48}$ and $\overline{T}_1$, respectively consist of one megacycle pulses everywhere $T_{48}$ and $T_1$ pulses, respectively, do not occur. The output of stage 1 is also fed to ring counter 133 which operates as does counter 132, however, with only four instead of forty-eight stages. The outputs of the four stages of counter 133 denoted 1, 2, 3, and 4 are fed to "and" gates 134 to 137 via delay circuits 138 to 141, respectively, and serve to control the passage of $T_n$ clock pulses through those gates. The $T_n$ pulses which pass through gates 138 to 141 are gated again by gates 142 to 145, respectively, which are all controlled by a signal from stage 146a of double input bistable flip-flop circuit 146, via delay 147. Stage 146a conducts when energized via line 148 from stage 1 of ring counter 122. The signal from stage 1 of counter 122 also controls "and" gate 149 via delay 150 serving to gate the output of "and" gate 142.

In operation, the four stages of counter 133 sequentially provide control signals to gates 138 to 141 causing those gates to open sequentially. Referring to FIG. 11b for an understanding of this operation, gate 138 opens during the "First Set" of numbers, gate 139 during the Second Set, gate 140 during the Third Set and gate 141 during the Fourth Set and the outputs of these gates are fed to gates 142 to 145, respectively, each of which remains open during the first number of each set. Therefore, waveforms M, N, Q and P issue from gates 142 to 145 and these waveforms consist of 1 $\mu$sec. pulses during the interval of the first number of the first, second, third, and fourth sets of numbers, respectively. Waveform R issuing from delay 150 consists of a single timing pulse at the beginning of every Fourth Set of numbers.

A matrix computer employing $\delta_x$, $\delta_y$, and $\delta_z$ pulses from gyroscope devices fixed to the $x$, $y$, and $z$ axes, respectively, of a body, such as shown in FIG. 1, to compute the nine coefficients $R_{ij}$ described by the nine equations M is shown in block diagram form in FIGS. 5a, 5b and 5c. This computer is provided a number of types of clock pulses derived from the electronic clock shown in FIGS. 10a and 10b. These clock pulses and other waveforms in the computer are shown in FIGS. 11a and 11b so that a better understanding of the operation of the matrix computer may be had. The various functions of the matrix computer are performed by dynamic circuitry, the principles of which are well-known and described in some detail in an article by R. W. Brooks on page 147 of the March 1957, issue of "Instruments and Automation." There is also some discussion of dynamic binary circuits on page 415 in "Pulse and Digital Circuits" by Millman and Taub, published by McGraw-Hill. The basic configuration of dynamic circuitry that is used in this invention to implement a typical one of the circuits shown in block diagram form in FIGS. 5a, b and c shown and described in FIGS. 7a, 7b and 7c, and a gyroscope device to produce the aforementioned $\delta$ pulses, say for example $\delta_x$, is shown in FIG. 8 and discussed hereinabove.

Turning now to FIGS. 5a, 5b, and 5c, there are shown computing and storing circuits responsive to the clock pulse outputs from the three gyroscope devices 71, 72, and 73 such as shown in FIG. 8, producing $\delta_x$, $\delta_y$, and $\delta_z$, clock pulses respectively, and sign signals $\sigma_x$, $\sigma_y$, and $\sigma_z$ clock pulses; each set of $\delta$ clock pulses representing an angular rotation of $2^{-6}$ radians of body 1 about one of its axes, $x$, $y$, or $z$, and each set of $\sigma$ pulses representing the sign or direction of the angle of rotation represented by the associated $\delta$ pulse.

Consider next the method of buffering a pulse $\delta_x$ and a signal $\sigma_x$ from gate 98 and circuit 99 respectively (FIG. 8). The $\delta_x$ pulse and $\overline{T}_1$ clock pulses from the electronic clock shown in FIG. 10 are fed to the input of dynamic circuit 100 as well as the $\beta$ output from circuit 100; thus, circuit 100 performs the following logic function:

(N) $\qquad \beta = (\overline{T}_1 \cdot \beta) \vee \delta_x$

In the above logic equation, an expression such as $(T_1 \cdot \beta)$ indicates the function of an "and" circuit producing an output when $\overline{T}_1$ and $\beta$ are present at its input. Also, an expression such as $(\overline{T}_1 \cdot \beta) \vee \delta_x$ signifies the logical function $\overline{T}_1$ and $\beta$ or $\delta_x$. Dynamic circuit 100 also produces a negative output, $\eta$, which is the negation of logic Equation P. Obviously, the logic equation for the $\eta$ output from circuit 100 is as follows:

(P) $\qquad \eta = (T_1 \vee \overline{\beta}) \cdot \overline{\delta}_x$

The $\beta$ output from circuit 100 is fed to an input of circuit 101 as well as $T_{48}$, $\delta_x$, $\overline{T}_{48}$ and the $\beta$ output from circuit 101. Timing pulses $T_{48}$ and $\overline{T}_{48}$ and signal pulse $\delta_x$ are all shown in the waveform diagrams of FIG. 11a. The logic of circuit 101 can be expressed by the following equation:

(Q) $\beta = (\beta \cdot \overline{T}_{48}) \vee (\delta_x \cdot T_{48}) \vee (\beta_{100} \cdot T_{48})$ The output from circuit 100 is also fed to circuit 102 along with $\overline{T}_{48}$, $T_1$, $\sigma_x$ and the $\beta$ output from circuit 102. The logic performed by circuit 102 is described by the following logic equation:

(R) $\beta = (\sigma_x \cdot T_{1_{100}}) \vee (\overline{T}_{48} \cdot \beta)$

In other words, the operation of circuits 100 and 101 is to produce a $\beta$ output from circuit 101, between successive $T_{48}$ pulses subsequent to a $\delta_x$ pulse setting circuit 100 into dynamic operation in which state it remains until a $T_1$ pulse occurs. Thus, referring to waveforms in FIG. 11a, circuit 101 produces a $\beta$ output only between the times successive $T_{48}$ pulses occur subsequent to the occurrence of a $\delta_x$ pulse, and by this action circuits 100 and 101 buffer $\delta_x$ pulses.

From logic Equation Q, it can be seen that circuit 102 is caused to produce a $\beta$ output upon simultaneously receiving a $\beta$ output from circuit 100, a $T_1$ pulse and a $\sigma_x$ signal (which is a ground level signal when $\delta_x$ represents a positive increment of rotation), and circuit 102 continues to produce a $\beta$ output until a $T_{48}$ pulse occurs. Circuit 102 also produces a negative, $\eta$, output. Thus, in the above instance the $\beta$ output from circuit 102 is a D.C. ground signal, when $\delta_x$ represents a positive increment of rotation. Consider next the operation of dynamic storage devices 157, 158, and 159 (FIGS. 5a, 5b, and 5c) which are identical in construction and operation, each serving to store three different ones of the nine numbers $R_{ij}$ expressed in Equations M. Since these storage devices are identical in construction and operation, the details of structure and operation of device 157 only will be described herein. Device 157 is comprised of a magnetostrictive delay line 160 which serves to delay each pulse input from coil 161, inductively coupled to one end thereof, 48 microseconds before it is detected at coil 162 which is inductively coupled to the other end and feeds amplifier 163. Since the dynamic system herein described runs at one megacycle as established by the one $\mu$sec. electronic clock pulses, magnetostrictive delay line 160 is capable of storing 48 bits of information at any particular instant, which in this embodiment describe three different numbers each of 16 binary bits including one bit representing the sign of the number. Three such numbers, each comprised of 16 binary bits are shown in time relationship and denoted inputs to amplifier 163 in the waveform diagrams of FIG. 11a wherein it is seen that the first or least significant binary bit of number $R_{Ix}$ coincides in time with timing pulse $T_1$. Pickup coil 164 is also inductively coupled to magnetostrictive delay line 160 at such a point that it detects a given pulse introduced by coil 161, eight microseconds before that same pulse is detected by coil 162 and feeds this pulse to amplifier 165. The output of amplifier 165 is fed to dynamic fill-in circuit 166 which serves to blank out the first 8 least significant binary bits of each of the three numbers stored in magnetostrictive delay line 160 and fill in 8 clock pulses following the sixteenth or sign bit of a number provided that sign bit indicates that the number is negative, by employing what are herein referred to as fill-in pulses $T_w$ and $\overline{T}_w$ from the electronic clock. The logic of circuit 166 may be expressed by the following logic equation:

(U) $\beta_{166} = \Delta R_{ix} = (R_{ix} \cdot T_w) \vee (\beta_{166} \cdot \overline{T}_w)$ As seen in Equation U above, the essential output from circuit 166 is equivalent to $\Delta R_{ix}$ which is an increment of binary number $R_{ix}$ stored in magnetostrictive device 160 and is shown in waveform diagram in FIG. 11a where it is denoted $\beta_{166}$. As expressed by logic Equation U above, the output $\beta_{166}$ consists of a pulse upon the simultaneous arrival at the input to circuit 166 of a $T_w$ pulse and one binary bit pulse from number $R_{ix}$ or upon the simultaneous arrival of a $\beta_{166}$ pulse and a $\overline{T}_w$ pulse at the input to circuit 166. Thus, the effect of circuit 166 in conjunction with coil 164 is to shift each number $R_{ix}$ 8 places, dropping the first 8 least significant binary bits of each number, and filling in the 8 binary bit spaces following each shifted number with clock pulses only when the number is negative. Meanwhile, magnetostrictive storage devices 159 and 160 with fill-in circuits 167 and 168, respectively, function in the same manner as magnetostrictive storage device 160 and circuit 166. Circuits 167 and 168 form the same functions in computing the shifted and filled in factors $\Delta R_{Iy}$ and $\Delta R_{Iz}$ as does circuit 166 to compute the factors $\Delta R_{Ix}$.

The operations of circuits 169 and 170 are to condition the outputs from circuits 167 and 168 in response to $\delta_y$ and $\delta_z$ clock pulses from gyro devices 72 and 73 and the $\sigma_y$ and $\overline{\sigma}_y$ and $\overline{\sigma}_z$ and $\sigma_z$ signals from gyro devices 72 and 73, respectively, so as to compute the factors $\Delta R_{Ix}$, $\Delta R_{IIx}$ and $\Delta R_{IIIx}$ as expressed in Equations K. For example, assume that at a given instant a 16-bit word $R_{Ix}$ is being fed through to circuit 166 in serial form, the least significant bit first, while at the same given instant, numbers $R_{Iy}$ and $R_{Iz}$ are being fed to circuits 167 and 168, respectively. The first eight least significant bits of each of these numbers are removed in circuits 166, 167 and 168 and pulses substituted after the remaining bits. Thus, the logic equations at said instant which are performed by circuits 166, 167, and 168 are expressed by Equations V.

(V) $\beta_{166} = \Delta R_{Ix} = (R_{Ix} \cdot T_w) \vee (\beta_{166} \cdot \overline{T}_w)$
$\beta_{167} = \Delta R_{Iy} = (R_{Iy} \cdot T_w) \vee (\beta_{167} \cdot \overline{T}_w)$
$\beta_{168} = \Delta R_{Iz} = (R_{Iz} \cdot T_w) \vee (\beta_{168} \cdot \overline{T}_w)$ The purpose of circuits 169 and 170 at the given instant is to feed shifted and filled binary numbers $\Delta R_{Iz}$ and $\Delta R_{Iy}$, respectively, to dynamic serial adder circuits 171 and 172, via delay circuits 173 and 174, respectively, in response to $\delta_y$ clock pulses and $\sigma_y$ signals and $\delta_z$ clock pulses and $\sigma_z$ signals, respectively. The function of dynamic serial adder circuits 171 and 172, at said given instant, is to add or subtract $\Delta R_{Iz}$ and $\Delta R_{Iy}$ to $R_{Ix}$ upon the occurrence of $\delta_y$ and $\delta_z$ increments, thereby performing the operation described by the first one of Equations K and the first one of Equations M. As stated hereinabove, coil 164 detects each binary bit eight microseconds before coil 161 detects the same bit, and since the numbers stored in the magnetostrictive device 160 in serial form one after the other are detected by coils 162 and 164, the least significant binary bit first, the number detected by coil 164, say for example shifted number $\Delta R_{Ix}$, will actually be $2^{-8}$ times the number $R_{Ix}$ detected by coil 162. Likewise and in the same manner, the shifted binary serial numbers fed to circuits 167 and 168 are thereby reduced by a factor $2^{-8}$. The purpose of delay circuits 173 and 174 is to delay output signals from circuits 169 and 170, respectively, so that the binary serial numbers fed from them to adders 171 and 172 are shifted only six microseconds with respect to the number $R_{Ix}$ to which they are added or subtracted. Thus, delay circuits 173 and 174 add whatever delay is necessary, along with the inherent delays in circuits 167, 168, 169, and 170, to cause the six microsecond shift so that the significance of each $\delta$ pulse from a gyro device of $2^{-6}$ radians is maintained. The logic performed by circuits 169 and 170 at said given instant is expressed by the following two logic equations:

(W) $\beta_{169} = (\delta_y \cdot \sigma_y \cdot \Delta \overline{R}_{Iz}) \vee (\delta_y \cdot \overline{\sigma}_y \cdot \Delta R_{Iz})$
$\beta_{170} = (\delta_z \cdot \sigma_z \cdot \Delta \overline{R}_{Iy}) \vee (\delta_z \cdot \overline{\sigma}_z \cdot \Delta R_{Iy})$ As can be seen from the first of logic Equations W above, an assertive output from circuit 169, indicative of $\Delta R_{Iz}$, occurs when, simultaneously $\delta_y$ clock pulses, $\sigma_y$ clock pulses and $\Delta \overline{R}_{Iz}$ pulses from circuit 168 simultaneously arrive at the input of circuit 169 or when $\delta_y$ clock pulses, a $\overline{\sigma}_y$ signal and $\Delta R_{Iz}$ pulses simultaneously arrive. This assertive output indicative of $\Delta R_{Iz}$ and its negation, indicative of $\Delta \overline{R}_{Iz}$, which are both fed to serial adder 171 has the effect of adding the number $\Delta R_{Iz}$ to the number $R_{Ix}$ also fed to adder 171 from amplifier 163 when the $\delta_y$ increment represents a positive rotation of body 1. On the other hand, if the $\sigma_y$ signal input to circuit 172 is not a ground signal, as when $\delta_y$ clock pulses indicate a positive rotation of body 1, but rather when $\sigma_y$ is comprised of negative clock pulses (swinging negative from ground), then the complement of serial binary number $\Delta R_{Iz}$ or $\Delta \overline{R}_{Iz}$ will be added to the number $R_{Ix}$ by the action of the adder 171, thereby effectively subtracting $\Delta R_{Iz}$ from $R_{Ix}$. Circuit 170 operates in a manner similar to circuit 169 to condition number $R_{Iy}$ in response to pulses indicative of $\delta_z$ and the sign of $\delta_z$ as represented by $\sigma_z$ signals or pulses, so that the number $\Delta R_{Iy}$ is added or subtracted to the output of adder 171 by the action of adder 172 to thereby complete computation of the first one of Equations K and the first one of Equations M.

Binary serial adders 171 and 172 associated with magnetostrictive storage device 157, as well as the other adders shown in FIGS. 5b and 5c associated with storage devices 158 and 159, may operate as any of the high speed serial adders known to the art such as, for example, described on page 461 of the March 1957, edition of "Instruments and Automation" published by the Instruments Publishing Company of Pontiac, Illinois.

Turning next to FIGS. 6a, 6a', 6b, and 6c, there is shown dynamic circuitry for computing the velocity and position coordinates of body 1 with respect to the reference frame, in response to the outputs from accelerometer devices such as shown in FIG. 9, the nine numbers, $R_{ij}$, from dynamic fill-in circuits of the matrix computer, a signal representative of gravity, and timing signals. Assuming that the origin of the reference frame is at the center of the earth and that the journey of body 1 commences from a point on the surface of the earth through which the III reference axis passes, the distances $S_I$, $S_{II}$ and $S_{III}$ at the initiation of the journey will be 0, 0, and $R_e$, respectively, where $R_e$ represents the radius of the earth. Subsequently, as body 1 moves from its initial position, the distances $S_I$, $S_{II}$ and $S_{III}$ change and it can be readily seen that a change in the direction of gravity relative to the reference frame will occur and, therefore, the increment of velocity of body 1 in the direction of, say for example the I axis *due to gravitational acceleration*, g, can be expressed as follows:

(A')
$$\Delta V_{gI} = \frac{S_I}{R_e} \Delta V_g$$

In the above equation, the term $\Delta V_g$ represents an increment of velocity due to gravitational acceleration and, of course, this increment is always directed towards the center of the earth. The term $\Delta V_{gI}$ represents the component of $\Delta V_g$ in the direction of the reference axis I or, in other words, the projection of $\Delta V_g$ on the I axis.

Considering first the operation of the computer for computing $V_I$ and $S_I$ shown in FIGS. 6a and 6a', there is shown dynamic commutator circuit 175 whose input consists of seven parallel AND gates each having inputs as shown in the figure. This circuit acts in accordance with the principles hereinabove described with reference to FIG. 7b and more generally as a commutator sequentially feeding the numbers $\Delta R_{Ix}$ or $\Delta \overline{R}_{Ix}$, $\Delta R_{Iy}$ or $\Delta \overline{R}_{Iy}$, and $\Delta R_{Iz}$ or $\Delta \overline{R}_{Iz}$ from dynamic fill-in circuits 176, 177 and 178 to serial binary adder 179 each time $v_x$, $v_y$, and $v_z$ clock pulses are produced in response to accelerometer devices 34, 35, and 36 by circuitry such as shown in FIG. 9. These dynamic fill-in circuits operate as does circuit 166 and each is coupled to a different magnetostrictive line via an amplifier and a pick up coil. Thus, nine fill in circuits, 166, 167, 168, 176, 177, 178, and 180, 181 and 182 are shown in FIGS. 5a, 5b, and 5c each yielding a different $\Delta R_{ij}$ number in assertive and negative form. Each pick up coil associated with each of these nine dynamic fill in circuits is coupled to a different section of a different one of the three magnetostrictive lines and each fill in circuit is controlled by the same $T_w$ and $\overline{T}_w$ pulses so that the nine shifted and filled numbers $\Delta R_{ij}$ issue therefrom simultaneously during the sixteen bit interval of the first number period of each set of numbers (see FIGS. 11a and 11b).

Serial binary adder 179 serves to add the number from dynamic commutator circuit 175 to the 16 bit serial binary number $V_I$ stored in magnetostrictive delay line 183 and upon performing said addition applies the sum to said delay line via coil 184. Another coil 185 is provided at the other end of magnetostrictive delay line 183 and serves to pick up the number stored therein and feed it to amplifier 186 which yields $\beta$ and $\eta$ outputs which are in turn applied to adder 179. Thus, the continuously adjusted number $V_I$ continues to circulate in the loop consisting of adder 179, coil 184, magnetostrictive delay line 183, coil 185 and amplifier 186. The number $V_I$ is also detected in serial form from delay line 183 by coil 187 which detects each bit of said number twelve bits before coil 185, thus shifting the number by twelve bits. This shifted number is fed to dynamic fill in circuit 188 via amplifier 184. Circuit 188 which is also fed $T_w$ and $\overline{T}_w$ pulses operates in the same manner as dynamic fill-in circuit 169, described with reference to FIG. 5a, and has a $\beta$ output described by the following logic equation:

(B')
$$\beta_{188} = (V_I \cdot T_w) \vee (\beta_{188} \cdot \overline{T}_w)$$

The assertive output from circuit 188 is fed to dynamic circuit 189 along with $\Delta T$ clock pulses which are derived from a gravity pulse regenerator and associated buffer circuits controlled by R pulses also shown in FIG. 6a and which will be described later. Circuit 189 serves to feed the shifted and filled in number from magnetostrictive line 187 to serial binary added 190 via appropriate delay circuits 191 at intervals controlled $\Delta T$ clock pulses. Delay 191 is such that the total delay from coil 187 to the input to adder 190 is two $\mu$secs. or two binary bits resulting in a net shift of the number $V_I$ of 10 bits so that $\Delta V_I$ fed to adder 190 equals $2^{-10} V_I$. Sixteen bit serial binary number $S_I$ stored in magnetostrictive delay line 192 is also fed to adder 190 via coil 193 and amplifier 194 so that the 10 bit shifted and filled in number from line 183 is added to the number $S_I$ already stored in line 192. The output of adder 190 is applied to one end of line 192 via coil 195, thus completing the loop associated with magnetostrictive delay line 192.

As shown above with reference to the equation A', the projection of an increment of velocity due to gravity $\Delta V_{gI}$ is a function of one variable, that variable being the distance $S_I$. Thus, by appropriately detecting the sixteen bit serial binary number $S_I$ stored in device 192 so as to shift it a predetermined number of bits, say for example 9 bits, and by blanking the first eight least significant bits of said sixteen bit shifted number and filling in eight bit spaces following said shifted number with fill-in circuit 196 and adding the result to $V_I$ by means of dynamic commutator circuit 175 and serial binary adder 182 at intervals established by G clock pulses, the effects of gravity in the direction of axis I are taken into account. Consequently, coil 197 is positioned along magnetostrictive delay device 192 so as to feed a shifted value of $S_I$ to fill in dynamic fill in circuit 196 via amplifier 198 and the $\eta$ output from circuit 196 is then fed to the last "and" circuit input to dynamic commutator circuit 175. It should be noted from the waveform diagrams of FIG. 11b that waveforms M, N, Q, and P serve to feed the numbers $\Delta R_{Ix}$, $\Delta R_{Iy}$, $\Delta R_{Iz}$, and $\Delta V_{GI}$, respectively, sequentially in the mentioned order to serial adder 179 provided the associated $v_x$, $v_y$, $v_z$ and G clock pulses are received from their associated dynamic buffer stages and, furthermore, it should be noted that the dynamic buffer stages yielding these clock pulses, buffer in accordance with R pulses (see FIGS. 6a, 6b, 6c, and 11b). An understanding of the source of the G clock pulses and ΔT clock pulses mentioned above may be had by reference to buffer devices 199 and 200 each responsive to pulses from pulse rate generator 201. Buffer 199 buffers pulses from generator 201 in accordance with R pulses, shown in FIG. 11b, while buffer 200 buffers in accordance with $T_{48}$ pulses, shown in FIG. 11a. The logic of each of these buffer circuits is the same, therefore, only circuit 199 will be described as follows; a pulse from generator 201 causes a β output from circuit 202 and this β output consisting of one megacycle clock pulses continues, provided an R pulse has not arrived at the input to circuit 202. The β output from circuit 202 is applied to dynamic circuit 203 and causes a β output from circuit 203 upon the arrival of an R pulse and this β output, consisting of one megacycle clock pulses, continues until the next R pulse occurs. Thus, the output of circuit 203 consists of a string of G clock pulses during the interval between successive R pulses following a pulse from generator 201.

As mentioned above, the number $S_I$ is detected by coil 197 shifting it nine bits so that upon filling in bit spaces following said shifted number and adding the result to $V_I$ at intervals established by G clock pulses, the effects of gravity are taken into account. Due to the inherent delay of circuits 196 and 175 $\Delta V_{gI}$ as added to $V_I$ is shifted only seven bits. Obviously, the shifted numbers from all magnetostrictive delay lines representing $\Delta R_{ij}$, $\Delta V_i$ or $\Delta \delta_i$ and the frequency of $F_g$ generator 201 must be coordinated so that stored numbers such as $V_1$ and $S_1$ accurately represent velocity and displacement of body 1 in the reference frame. For example, on the surface of the earth at the initiation of the journey of body 1 from a point through which the I axis passes, the distance $S_I$ equals the radius of the earth, $R_e$, and $\Delta V_g$ equals the interval G, times the acceleration of gravity, g, at the surface of the earth. Thus, the following equations are true:

(C') $\qquad \Delta S_I = 2^{-N} \cdot R_e$ (D') $\qquad \Delta V_{Ig} = G \cdot g$ Where N is the number of bits the number $S_I$ from the magnetostrictive delay line 192 is shifted before applied to adder 182. The following equation is obvious in view of the operation of magnetostrictive delay line 183 and coil 187.

(E') $\qquad \Delta V_I = 2^{-M} \cdot V_I$ and the following, in view of the fact that G and ΔT clock pulses are both derived from the $F_g$ pulse generator.

(F') $\qquad 1/G = 2^{-P} \cdot 1/\Delta T$

In the Equations (E') and (F'), M is the number of bits the number $V_I$ from delay line 183 is shifted before applied to adder 190 and P is (in the embodiment herein described) equal to zero. The action of circuit 189 is to perform the following:

(G') $\qquad \Delta S_I = \Delta T \cdot V_I$

Combining equations (C') and (E') and (G') the following is obtained:

(H') $\qquad 2^{-N} \cdot R_e = \Delta T \dfrac{\Delta V_I}{2^{-M}}$

Now while it is not necessary that $\Delta V_g$ be equal to the increments of velocity $v_x$, $v_y$, and $v_z$, it is required, that the increments $\Delta V_g$ and $\Delta V_I$ be equal because G and ΔT intervals are equal, thus;

(J') $\qquad \Delta V_I = \Delta V_g$ and combining (D'), (H'), and (J'), the following is obtained:

(K') $\qquad 2^{-N} \cdot R_e = \Delta T \dfrac{G \cdot g}{2^{-M}}$ and combining (H') and (K')

(L') $\qquad \dfrac{1}{\Delta T} = 2 \dfrac{M+N+P}{2} \cdot \sqrt{\dfrac{g}{R_e}}$ Equation L' is readily recognized as the Schuler equation thus confirming the derivation. Substituting values in the above equation, L' to establish $1/\Delta T$ and, thus, $F_g$ for the embodiment herein described, the following is obtained:

(M') $\qquad \dfrac{1}{\Delta T} = 2 \dfrac{7+10+0}{2} \cdot \sqrt{\dfrac{32.2}{20.5 \times 10^6}} = .045 pps$ By this method the required pulse rate $F_g$ of pulse generator 201 is established.

Referring next to FIGS. 6b and 6c, there are shown systems which operate in an identical manner with the system shown in FIG. 6a and hereinabove described. The system shown in FIG. 6b serves to compute and store the numbers $V_{II}$ and $S_{II}$ in magnetostrictive storage devices 204 and 205, respectively, in response to numbers $\Delta R_{IIx}$, $\Delta R_{IIy}$, and $\Delta R_{IIz}$ from dynamic fill in circuits 176, 177 and 178 of the matrix computer. In FIG. 6c, there is shown dynamic circuitry for computing and storing the numbers $V_{III}$ and $S_{III}$ in magnetostrictive storage devices 206 and 207, respectively, in response to the numbers $\Delta R_{IIIx}$, $\Delta R_{IIIy}$ and $\Delta R_{IIIz}$ from the dynamic fill-in circuits 180, 181 and 182 of the matrix computer. Both the systems shown in FIGS. 6b and 6c operate as does the system shown in FIG. 6a and both are also fed G and ΔT clock pulses from buffers 199 and 200, respectively.

Obviously, appropriate meter devices may be coupled to the $V_i$ and $S_i$ storage devices shown in FIGS. 6a, b, and c for yielding visual indications representative of the velocities and displacements of body 1 in the initial reference frame, and an operator observing these velocities and displacements may intelligently navigate said body in the initial reference frame or in any other reference frame whose orientation and displacement with regard to the initial reference frame is known.

While I have described above the principles of my invention in connection with specific apparatus, it is obvious that other apparatus such as other digital systems could be employed in substitution therefor without deviating from the spirit and scope of my invention and that this description is made only by way of example and not as a limitation to the scope of my invention as set forth in the objects thereof and in the accompanying claims.

We claim:

1. A system for producing digital signals representing the attitude, velocity and position of a body with respect to a reference spatial frame comprising a body, means, including a plurality of rotation-sensing devices and a plurality of translational acceleration sensing devices coupled to said body, for producing signals some representative of components of angular rotation of said body about their rotation-sensitive axes and others representative of increments of velocity of said body parallel to their sensitive directions, means for mounting said sensing devices on said body with rotation-sensitive axes and sensitive directions fixed with respect to said body, each of said rotation-sensitive axes being aligned with a different one of said sensitive directions, and each of said sensitive axes and sensitive directions being orthogonally related with respect to each other, first digital computer means adapted to store a first plurality of signals each signal representing only one, and a different one of the separate angles formed by different combinations of ones of the sensitive axes with ones of the reference frame axes, all of said first plurality of signals together representing each of the angles formed by all the combinations of each of said sensitive axes with each of the reference frame axes, second digital computer means responsive to said signals representative of increments of velocity and said first plurality of signals for computing and storing a second and a third plurality of signals representative of the velocity and position, respectively, of said body with respect to said reference frame axes and means coupled to said signal producing means for applying said signals therefrom to modify the signals in said first, second and third storage means so that the signals in said storage means continuously represent the attitude, velocity and position of said body with respect to that of the reference frame.

2. A system according to claim 1 wherein said reference spatial frame is three-dimensional and in which there are three rotation-sensing devices and three translational acceleration sensing devices defining three rotation and translation sensitive body axes, and said first storage means includes nine registers each representing the value of a different single one of the angles formed by the different combinations of each of said sensitive axes with each of the reference axes of the three-dimensional reference frame.

3. A system as in claim 1 wherein said function of a different angle is the cosine of the angle.

4. A system for providing information representing the attitude, velocity and position of a body with respect to the three axes of a reference spatial frame comprising a body, a plurality of rotation sensitive devices each fixed to said body so as to be sensitive to rotations of said body about at least one of three orthogonal body axes and each producing rotation signals representative of equal increments of rotation of said body about a different one of said body axes, a plurality of translational acceleration sensitive devices each sensitive to accelerations of said body in the direction of a different one of said body axes and each producing translation signals representative of equal increments of velocity of said body in the direction of said body axes, first binary number storage means for storing nine numbers each representing a function of a different angle between one of said body axes and one of said reference axes, first adding and subtracting means coupled to each of said first storage means, weighting means coupled to each of said first storage means, gating means coupling the output of said weighting means from each of said first storage means to the adding and subtracting means coupled to others of said first storage means, means coupling predetermined ones of said rotation signals to each of said gating means so that weighted outputs from each of said first storage means are combined by said adding and subtracting means with numbers stored in each of said other first storage means in response to predetermined ones of said signals, second binary number storage means for storing three numbers representing the velocity and three other numbers representing the position of said body with respect to said reference frame coupled to said acceleration sensitive devices and said first storage means and having second adding and subtracting means therein for adding said nine numbers in response to said translation signals to produce said three numbers representing velocity and third adding and subtracting means therein responsive to timed signals for integrating said three numbers representing velocity to produce said three numbers representing position, the complete system operating to continuously represent the attitude, velocity and position of said body with respect to said reference spatial frame.

5. A system as in claim 4 and further including means responsive to said timed signals for coupling said three numbers representing position to said second adding and subtracting means so as to alter said three numbers representing velocity to thereby account for effects of gravity on said body.

6. A system as in claim 4 wherein said plurality of rotation-sensitive devices each comprises as its sensitive element a gyroscope each oriented so as to be sensitive to rotations of said body about at least one of said body axes and said plurality of translational acceleration sensitive devices each comprises as its sensitive element an accelerometer sensitive to accelerations of said body in the direction of at least one of said body axes.

7. A system for providing information representing the orientation, velocity and position of three orthogonal axes fixed to a body with respect to three orthogonal axes of a spatial reference frame comprising a body having a plurality of body axes bearing a predetermined relationship to each other, a plurality of gyroscope devices and a plurality of accelerometer devices each fixed to said body with their sensing axes aligned with different ones of said body axes, different signal producing means coupled to each of said devices for producing, in the case of the gyroscope devices, incremental signals each increment representing a given angle of rotation of said body about one of said body axes and, in the case of accelerometer devices, incremental signals each increment representing equal increments of velocity of said body in the direction of said body axes, a first plurality of serial binary number storage means each storing three different attitude numbers representing the cosines of angles between different ones of said body axes and said reference frame axes, first means for adding and subtracting weighted values of said numbers from each of said storage means to predetermined numbers in others of said storage means in response to predetermined ones of said signals so that said attitude numbers continually represent the attitude of said body with respect to said reference frame, a second plurality of serial binary number storage means each storing a number representing the velocity of said body in the direction of a different one of said reference frame axes, a third plurality of serial binary number storage means each storing a number representing the distance of said body in the direction of a different one of said reference frame axes from the origin of said reference frame, second adding and subtracting means coupled to said second storage means, third adding and subtracting means coupled to said third storage means, first gating means coupled to the output of said first storage means and said accelerometer devices for feeding numbers stored therein to said second adding and subtracting means in response to said signals representing equal increments of velocity, a timing signal generator, second gating means coupled to the output of said second storage means and said timing signal generator for feeding said numbers representing velocity to said third adding and subtracting means in response to said timing signals, a gravity signal generator coupled to said timing signal generator and fourth gating means coupled to the output of said third storage means and said gravity signal generator for feeding said numbers representing distance to said second adding and subtracting means in response to said gravity signals so that said velocity numbers and said distance numbers continually represent the velocity and position of said body with respect to said reference frame.

8. A system as in claim 7 wherein each of said gyroscope devices comprises a single degree of freedom gyroscope having rotation sensing means and torquing means coupled to its output axle, means coupling said rotation sensing and said torquing means whereby said axle is torqued in response to the output of said rotation sensing means maintaining said gyroscope essentially fixed with respect to said body when said body rotates and means responsive to said coupling means for producing said signals representative of equal increments of rotation.

9. A system as in claim 7 wherein each of said first, second and third serial binary storage means comprises a magnetostrictive delay line having an input end and an output end and means coupling said ends whereby at least one serial binary number may be represented in each magnetostrictive delay line at a given instant.

10. A system as in claim 7 further including clock means for producing a plurality of different signals for synchronizing the operation of each of said serial binary storage means.

11. A system for providing numbers representative of attitude, velocity and position of orthogonal body axes fixed to a body with respect to orthogonal reference axes of a spatial reference frame comprising a body having a plurality of body axes bearing a predetermined relationship to each other, a plurality of gyroscope devices coupled to said body each for sensing rotations of said body about a different one of said body axes and each producing pulses representative of equal increments of rotation of said body about one of said body axes and a signal representative of the sign of said rotation, a plurality of accelerometer devices coupled to said body each for sensing accelerations of said body in the direction of a different one of said body axes and each producing pulses representative of equal increments of velocity in the direction of one of said body axes and a signal representative of the sign of said velocity increment, a plurality of serial binary number storage means each comprising a magnetostrictive delay line having an input and an output with dynamic serial adding and subtracting means coupling said input and output and number weighting means coupled to said delay line for producing equally weighted values of each of the numbers stored therein, said weighting bearing a fixed relationship to said equal increments, a plurality of pairs of gating means associated with a first group of said storage means, one gating means of each pair coupling the output of one weighting means associated with one delay line of said first group to the adding means associated with another delay line of said first group and the other coupling the output of the same said weighting means to the subtracting means associated with a third delay line of said first group, different dynamic circuit means coupling said pulses and signals from each of said gyroscope devices to a different pair of said gating means so that each of said weighted numbers from said first group is added to certain of said stored numbers stored in said first group and subtracted from others in response to pulses and signals from certain of said gyroscope devices to thereby continuously provide stored numbers in said first group representative of the orientation of said body axes with respect to said reference axes, means for generating a plurality of timing signals, a plurality of commutator-type gating means, one associated with each of a second group of said storage means, means including said number weighting means for coupling the stored numbers of said first group to each of said commutator-type gating means, means coupling timing signals and the output of said accelerometer devices to each of said commutator-type gates so that said stored numbers from said first group are fed to the adding and subtracting means associated with said second group of storage means in response to said velocity increment pulses, said velocity increment sign signals and said timing signals, integrating gating means one associated with each of a third group of said storage means, means including said number weighting means for coupling the stored numbers in said second group to each of said integrating gating means, means coupling a single timing signal to said integrating gating means so that weighted values of the numbers stored in said second group are added to the numbers stored in said third group at regular intervals, and means for applying weighted values of the numbers in said third group to said commutator-type gate so that weighted values are added to the numbers in said second group at predetermined intervals thereby compensating for the effects of gravity as said body moves with respect to said reference frame, the numbers stored in said second and third groups continuously representing the velocity and position of said body with respect to said reference axes.

12. A system for providing information representing the velocity and position of a body with respect to a reference spatial frame comprising a body having a plurality of body axes bearing a predetermined relationship to each other, means coupled to said body for providing signals representing the attitude of said body with respect to said reference frame, acceleration sensing means coupled to said body having predetermined orientation with respect to said body axes with dynamic binary circuits coupled thereto for providing pulses each representing equal increments of velocity of said body, first resolving means responsive to said attitude pulses for resolving said attitude pulses into their components in the direction of the axes of said reference frame, second resolving means responsive to said velocity pulses for resolving said velocity pulses into their components in the direction of the axes of said reference frame, first storage means coupled to said first resolving means to store said attitude and attitude direction pulses, timing signal generating means, first binary serial number storage means for storing numbers indicative of velocity, commutator gating means responsive to said timing signals for coupling said first binary serial number storage means to said first storage means and to said acceleration sensing means with coupled binary circuit, means for generating signals accounting for gravitational acceleration, means coupling said gravitational acceleration signals to said commutator gating means, second binary serial number storage means for storing numbers indicative of position, and means coupling said second binary serial number storage means to said first binary serial number storage means.

References Cited by the Examiner
UNITED STATES PATENTS

| | | | |
|---|---|---|---|
| 2,752,091 | 6/56 | McKenney et al. | 235—187 |
| 2,835,131 | 5/58 | Vacquier et al. | |
| 2,945,643 | 7/60 | Slater. | |
| 3,049,294 | 8/62 | Newell | 73—178 |
| 3,087,333 | 4/63 | Newell | 73—178 |

MALCOLM A. MORRISON, *Primary Examiner.*

SAMUEL FEINBERG, ROBERT B. HULL, ARTHUR M. HORTON, *Examiners.*